(12) United States Patent
Inoue et al.

(10) Patent No.: US 10,895,214 B2
(45) Date of Patent: Jan. 19, 2021

(54) CONTROL SYSTEM FOR COMPRESSION-IGNITION ENGINE

(71) Applicant: Mazda Motor Corporation, Hiroshima (JP)

(72) Inventors: Atsushi Inoue, Aki-gun (JP); Masanari Sueoka, Hiroshima (JP); Kota Matsumoto, Aki-gun (JP); Keiji Maruyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 206 days.

(21) Appl. No.: 16/056,753

(22) Filed: Aug. 7, 2018

(65) Prior Publication Data

US 2019/0063360 A1 Feb. 28, 2019

(30) Foreign Application Priority Data

Aug. 25, 2017 (JP) ................................ 2017-161688

(51) Int. Cl.
*F02D 41/30* (2006.01)
*F02P 5/15* (2006.01)
*F02B 1/10* (2006.01)
*F02B 1/14* (2006.01)
*F02B 11/02* (2006.01)
(Continued)

(52) U.S. Cl.
CPC ............ *F02D 41/3017* (2013.01); *F02B 1/10* (2013.01); *F02B 1/14* (2013.01); *F02B 11/02* (2013.01);
(Continued)

(58) Field of Classification Search
CPC .......... F02D 2041/0015; F02D 41/402; F02D 41/3041; F02D 41/3047; F02D 41/3017;
(Continued)

(56) References Cited

U.S. PATENT DOCUMENTS 5,850,816 A * 12/1998 Ohsuga ................. F02B 17/005
123/430
6,293,246 B1 * 9/2001 Tanahashi ................. F01L 1/34
123/305
(Continued)

FOREIGN PATENT DOCUMENTS

JP S5820925 A 2/1983
JP 2003049691 A 2/2003
(Continued)

*Primary Examiner* — Sizo B Vilakazi
(74) *Attorney, Agent, or Firm* — Alleman Hall Creasman & Tuttle LLP

(57) ABSTRACT

A control system for a compression-ignition engine is provided, which includes the engine, a spark plug, a fuel injection valve, an air-fuel ratio control valve, and a control unit. A geometric compression ratio of the engine is 14:1 or above. The control unit includes a processor configured to execute an air-fuel ratio controlling module for, when the engine being in a given operating state is detected, controlling the air-fuel ratio control valve to bring the air-fuel ratio of the entire mixture gas to a given lean air-fuel ratio that is larger than a stoichiometric air-fuel ratio, and an spark plug controlling module for, after this control, outputting the control signal to the spark plug to perform the ignition at a given ignition timing so that the mixture gas starts combustion by flame propagation and then unburned mixture gas self-ignites. The given ignition timing is stored in a memory.

14 Claims, 19 Drawing Sheets

(51) Int. Cl.
*F02D 41/00* (2006.01)
*F02D 41/26* (2006.01)
*F02D 37/02* (2006.01)
*F02D 41/40* (2006.01)
*F02D 41/38* (2006.01)

(52) U.S. Cl.
CPC ......... *F02D 41/0002* (2013.01); *F02D 41/26* (2013.01); *F02D 41/3041* (2013.01); *F02D 41/3047* (2013.01); *F02P 5/1502* (2013.01); *F02D 37/02* (2013.01); *F02D 41/3029* (2013.01); *F02D 41/402* (2013.01); *F02D 2041/0015* (2013.01); *F02D 2041/3052* (2013.01); *F02D 2041/389* (2013.01)

(58) Field of Classification Search
CPC ................. F02D 41/0002; F02D 41/26; F02D 2041/389; F02D 37/02; F02D 41/3029; F02D 2041/3052; Y02T 10/125; Y02T 10/146; F02P 5/1502; F02B 1/14; F02B 11/02; F02B 1/10
See application file for complete search history.

(56) References Cited

U.S. PATENT DOCUMENTS

| | | | | |
|---|---|---|---|---|
| 2002/0038645 | A1* | 4/2002 | Chmela | F02D 41/3041 123/276 |
| 2009/0194081 | A1* | 8/2009 | Ito | F02D 41/3041 123/575 |
| 2014/0216396 | A1* | 8/2014 | Yamashita | F02P 5/153 123/297 |
| 2015/0211431 | A1* | 7/2015 | Harada | F02F 3/14 123/295 |
| 2017/0292462 | A1* | 10/2017 | Tsuda | F02D 13/0273 |
| 2018/0306131 | A1* | 10/2018 | Tsuda | F02D 41/40 |

FOREIGN PATENT DOCUMENTS

| | | |
|---|---|---|
| JP | 2006283571 A | 10/2006 |
| JP | 2010077857 A | 4/2010 |
| JP | 2011021553 A | 2/2011 |
| JP | 2017145696 A | 8/2017 |

* cited by examiner

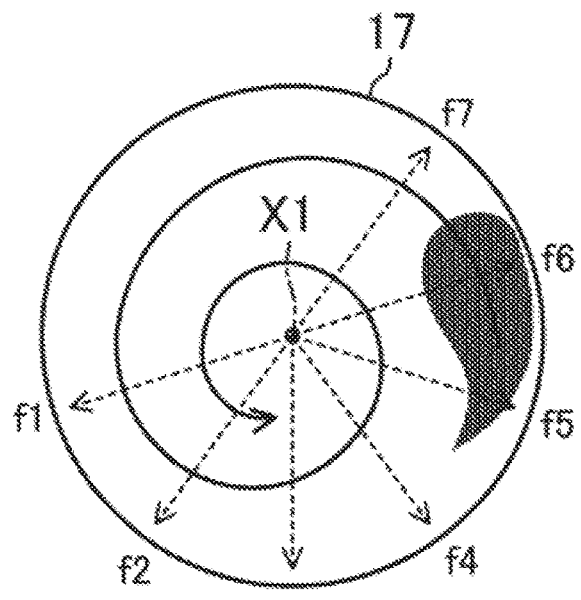
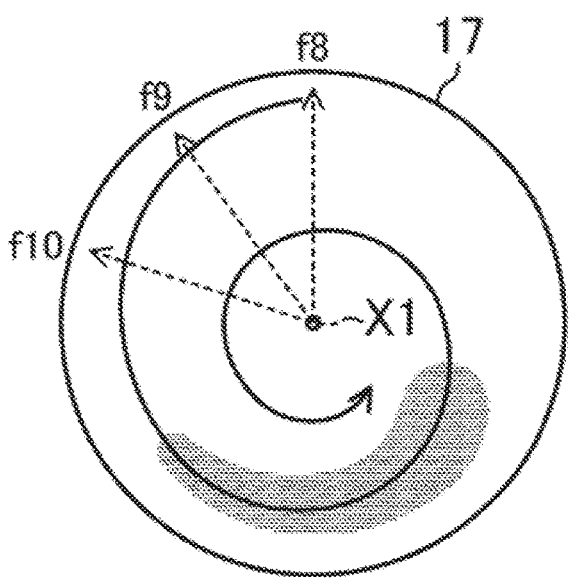
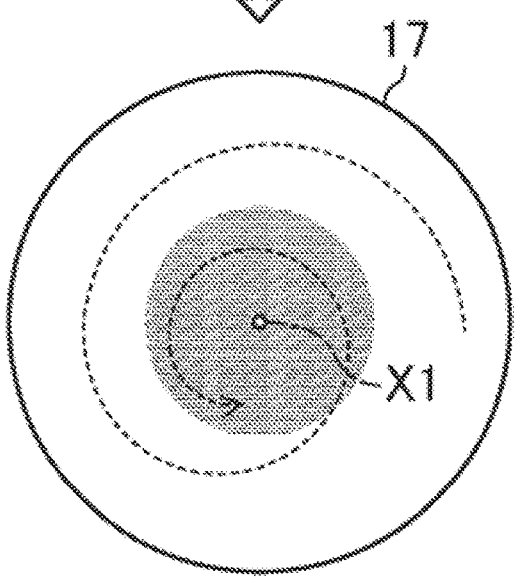
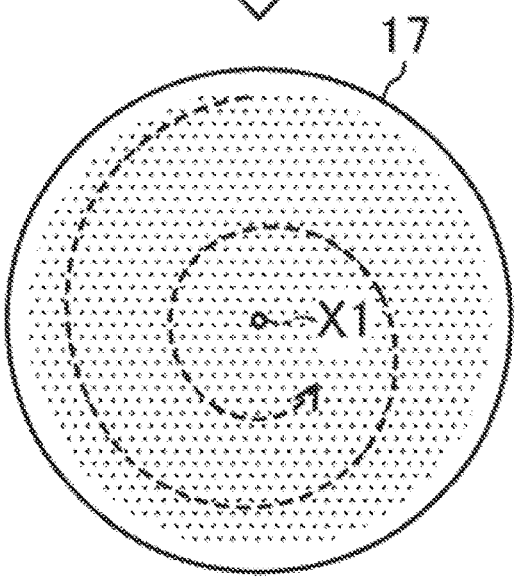
FIG. 9A  FIG. 9B

CONTROL SYSTEM FOR COMPRESSION-IGNITION ENGINE

TECHNICAL FIELD

The present disclosure relates to a control system for a compression-ignition engine.

BACKGROUND OF THE DISCLOSURE

JP2006-283571A discloses an ignition assist CI (Compression Ignition) engine in which ignition caused by compression self-ignition is assisted by SI (Spark Ignition) combustion before the compression self-ignition within a high load segment of a partial engine load operating range of the engine. Further within this high load segment, a swirl flow is generated inside a cylinder.

In combustion by compression ignition, if a temperature inside the combustion chamber before the compression starts varies, the timing of the compression ignition greatly changes. By performing the ignition to cause the SI combustion before the CI combustion and adjusting a heat generation amount of the SI combustion, the variation in the temperature inside the combustion chamber before the compression starts can be reduced.

However, for example, when the engine operates within a low load operating range, the fuel injection amount decreases and the temperature inside the combustion chamber also decreases. Therefore, the spark ignition becomes difficult and the SI combustion becomes unstable, which may cause failed CI combustion due to insufficient temperature.

SUMMARY OF THE DISCLOSURE

The present disclosure is made in view of the above situations and aims to stably perform combustion in an engine while reducing generation of $NO_x$, even when the engine is operating within an operating range where compression self-ignition is difficult, e.g., a low load range.

The present inventors have established an art for accurately controlling a mixture gas distribution within a combustion chamber in order to achieve stable combustion even within such a disadvantageous range for combustion. Here, "mixture gas distribution" means a distribution of mixture gas containing fuel and gas (mainly containing air; may also contain burned gas).

According to one aspect of the present disclosure, a control system for a compression-ignition engine is provided, which includes an engine formed with a combustion chamber, a fuel injection valve configured to inject fuel into the combustion chamber, an spark plug configured to ignite mixture gas formed inside the combustion chamber by the fuel injected from the fuel injection valve, and a control unit including a processor connected to the fuel injection valve and the spark plug and configured to output a control signal to the fuel injection valve and the spark plug, respectively. The spark plug ignites the mixture gas to start SI combustion by flame propagation and then unburned mixture gas self-ignites to cause CI combustion.

The spark plug performs the ignition in a state where a geometric compression ratio of the engine is 14:1 or above, an air-fuel ratio of the entire mixture gas inside the combustion chamber is a given lean air-fuel ratio that is larger than a stoichiometric air-fuel ratio, and an air-fuel ratio of the mixture gas near the spark plug is smaller than an air-fuel ratio of the mixture gas therearound.

That is, with this control system for the compression-ignition engine, the spark plug forcibly ignites the mixture gas formed inside the combustion chamber to perform the SI combustion, and combustion heat and combustion pressure caused by the flame propagation causes unburned mixture gas to self-ignite and the CI combustion is performed. Since the geometric compression ratio of the engine is 14:1 or above, near a top dead center of compression stroke at which the combustion is performed, the mixture gas inside the combustion chamber is subjected to relatively high pressure. The CI combustion starts more easily as this pressure rises.

When performing the SI combustion, there is a tendency that generation of $NO_x$ increases as the air-fuel ratio (A/F) of the entire mixture gas inside the combustion chamber is set closer to the stoichiometric air-fuel ratio (e.g., 14.7:1). On the other hand, the $NO_x$ generation is reduced when the A/F of the entire mixture gas inside the combustion chamber is lean (larger than the stoichiometric air-fuel ratio), for example, A/F is 30:1 or above. Therefore, in a case where the engine operates within a low load range in which the fuel injection amount is small, it may be considered to perform the SI combustion in such a lean state so that the CI combustion occurs.

However, in such a lean state where a fuel concentration is low, the SI combustion by the forcible ignition becomes difficult, and even if the SI combustion is successfully performed, the flame propagation becomes unstable and the CI combustion cannot stably be performed.

In this regard, with this control system for the compression-ignition engine, the spark plug performs the ignition in the state where A/F of the mixture gas near the spark plug is smaller than A/F of the mixture gas therearound. Specifically, at the ignition timing, the A/F of the entire mixture gas inside the combustion chamber stratifies the mixture gas distribution within the combustion chamber while keeping the lean state where the $NO_x$ generation is reduced, and the ignition is performed in this state. The mixture gas located near the spark plug where the ignition is performed reaches a rich state where the fuel concentration is relatively high (smaller than A/F of the entire mixture gas), and the mixture gas located therearound reaches the lean state where the fuel concentration is relatively low (larger than A/F of the entire mixture gas).

Near the spark plug where the ignition is performed, since it is in the rich state, the SI combustion by the forcible ignition stabilizes. The flame propagation also stabilizes, and the combustion heat and pressure caused thereby stably act on the mixture gas around the spark plug. In combination with combustion under high pressure from applying a high compression ratio, the CI combustion is performed stably even in the lean state where the fuel concentration is low.

When the spark plug performs the ignition, the air-fuel ratio of the mixture gas near the spark plug may be between 20:1 and 35:1 and the air-fuel ratio of the mixture gas therearound may be between 35:1 and 50:1.

With the mixture gas at A/F between 20:1 and 35:1, the SI combustion by the ignition is performed relatively stably while reducing the $NO_x$ generation. Further, with the mixture gas at A/F between 35:1 and 50:1, the CI combustion by compression self-ignition is performed relatively stably while further reducing the $NO_x$ generation. By forming the stratified mixture gas distribution with uneven A/F, A/F of the entire mixture gas is kept lean, for example, 30:1 or above, which is suitable for the combustion within the low load range in which the fuel injection amount is small.

The spark plug may be disposed in a center portion of the combustion chamber. The control system may also include a swirl control valve configured to generate a swirl flow inside the combustion chamber. The control unit may control the fuel injection valve to inject the fuel at a given injection timing being after the swirl control valve generates the swirl flow, and control the spark plug to perform the ignition at a given ignition timing being after the fuel injection, so as to control the SI combustion while controlling a mixture gas distribution by the swirl flow.

According to this configuration, prior to the combustion, the swirl flow is generated inside the combustion chamber. The swirl flow is a whirling flow (lateral vortex) formed orthogonal to a center axis of a cylinder. The swirl flow has a relatively stable flow rate even if the volume of the combustion chamber changes or the operating condition of the engine changes.

Inside the combustion chamber where such swirl flow is generated, the fuel is injected at the given timing so that spray of the fuel reaches the swirl flow. The fuel spray, having reached the swirl flow, moves inside the combustion chamber along the swirl flow. This fuel spray deflects toward the center portion of the combustion chamber while gradually diffusing.

By injecting the fuel at a timing with a long period of time until the ignition timing, such as on the intake stroke, a homogeneously spread mixture gas distribution advantageous for CI combustion is formed. Further, by injecting the fuel at a timing with a short period of time until the ignition timing, such as on the compression stroke, since the diffusion is suppressed, a stratified mixture gas distribution including the high fuel concentration portion, advantageous for SI combustion, is formed.

By igniting at the given ignition timing while controlling the mixture gas distribution within the combustion chamber by the swirl flow as above, the SI combustion is started with the A/F described above in the state where the mixture gas distribution is stratified. As a result, the stable SI combustion is performed. By controlling this SI combustion, the timing of the compression ignition is controlled and the CI combustion is also performed at the suitable timing.

The swirl control valve may generate the swirl flow of which a swirl ratio is 2 or above.

Here, "swirl ratio" is a value obtained by measuring an intake flow lateral angular speed for each valve lift, integrating these values, and dividing this integrated value by an engine angular speed. The intake flow lateral angular speed may be obtained based on a measurement by a rig test. The swirl ratio is usable as an index expressing intensity of the swirl flow.

By generating a strong swirl flow at the swirl ratio of 2 or above, it is possible to place the injected fuel on the swirl flow to move over a wide range inside the combustion chamber, thus the homogeneous mixture gas is formed. Therefore, the mixture gas distribution within the combustion chamber is more accurately controlled.

The swirl control valve may generate the swirl flow of which the swirl ratio is 4 or above.

By having the swirl ratio of 4 or above, the swirl flow becomes stronger. With the strong swirl flow at the swirl ratio of 4 or above, since the mixture gas is diffused more, the homogeneous mixture gas distribution spreading over the combustion chamber entirely is formed. As a result, even with the lean mixture gas distribution of which A/F exceeds 35:1, the mixture gas is well homogenized and thus, the CI combustion is stably performed. This is advantageous within the low load range in which the fuel injection amount is small.

The control unit may output the control signal to the fuel injection valve to dividedly inject the fuel at a plurality of times on compression stroke.

Since the fuel injection performed on the compression stroke has a short period of time until the ignition timing, the diffusion over time is reduced, and the stratified mixture gas distribution including the high fuel concentration portion, advantageous for SI combustion, is formed. The mixture gas formed by sprays of the fuel portions in the dividedly performed plurality of fuel injections moves with the swirl flow, and at the ignition timing, the portion with high fuel concentration is located near the spark plug. In this manner, the rich mixture gas at higher fuel concentration compared to the case where the fuel is injected in a lump is formed deflected to near the spark plug.

Therefore, even when A/F of the entire mixture gas is lean (e.g., 30:1 or above), the rich mixture gas (e.g., A/F is 20:1) is stably formed near the spark plug, which is suitable for the combustion within the low load range in which the fuel injection amount is small.

The control unit may output the control signal to the fuel injection valve to fix the injection timing in a case where an engine speed changes while an engine load does not change.

As described above, the swirl flow receives little influence from the engine speed. Therefore, when the engine load does not change, i.e., the fuel injection amount is the same, even when the engine speed changes, by injecting the fuel at the same timing, a similar mixture gas distribution is formed inside the combustion chamber at the ignition timing. Thus, by the control unit outputting the control signal to the fuel injection valve to fix the injection timing in the case where the engine speed changes while the engine load does not change, the control is simplified while achieving the stable combustion.

According to another aspect of the present disclosure, a control system for a compression-ignition engine is provided, which includes an engine including a cylinder, a piston for reciprocating inside the cylinder along a center axis thereof, and a cylinder head, and formed with a combustion chamber defined by the cylinder, the piston, and the cylinder head, a spark plug disposed in the combustion chamber, a fuel injection valve disposed to be oriented into the combustion chamber, an air-fuel ratio control valve configured to adjust an air-fuel ratio of mixture gas inside the combustion chamber, and a control unit connected to the spark plug, the fuel injection valve, and the air-fuel ratio control valve and configured to output a control signal to the spark plug, the fuel injection valve, and the air-fuel ratio control valve. A geometric compression ratio of the engine is 14:1 or above. The control unit includes a processor configured to execute an air-fuel ratio controlling module to, when the engine being in a given operating state is detected, control the air-fuel ratio control valve to bring the air-fuel ratio of the entire mixture gas inside the combustion chamber to a given lean air-fuel ratio that is larger than a stoichiometric air-fuel ratio, and an spark plug controlling module to, after the control by the air-fuel ratio controlling module, output the control signal to the spark plug to perform the ignition at a given ignition timing so that the mixture gas starts combustion by flame propagation and then unburned mixture gas self-ignites, the given ignition timing being stored in a memory.

The air-fuel ratio controlling module may control the fuel injection valve so that, when the spark plug performs the ignition, an air-fuel ratio of the mixture gas near the spark plug is between 20:1 and 35:1 and an air-fuel ratio of the mixture gas therearound is between 35:1 and 50:1.

The control system may also include an intake port configured to introduce intake air into the combustion chamber, an exhaust port configured to discharge exhaust gas from the combustion chamber, and a swirl control valve provided in an intake passage connected to the intake port. The fuel injection valve may be attached to the cylinder head, be disposed to be oriented into the center of the combustion chamber in a plan view thereof, and have a first nozzle port with a nozzle port axis extending to the exhaust port side in the plan view and a second nozzle port with a nozzle port axis extending to the intake port side in the plan view. The processor may also be configured to execute a swirl control valve controlling module to control an opening of the swirl control valve so that a swirl ratio inside the combustion chamber becomes 2 or above, and a fuel injection valve controlling module to control the fuel injection valve to inject fuel at a given timing at which the swirl ratio is 2 or above.

The fuel injection valve controlling module may output the control signal to the fuel injection valve to perform a first fuel portion injection in which the fuel is injected in a period from intake stroke to an intermediate stage of compression stroke, and a second fuel portion injection in which the fuel is injected after passing a given period from the first fuel portion injection.

The fuel injection valve controlling module may set both execution timings of the first fuel portion injection and the second fuel portion injection to be on the intake stroke.

The fuel injection valve controlling module may set an execution timing of the first fuel portion injection to be on the intake stroke, and an execution timing of the second fuel portion injection to be on the compression stroke.

The fuel injection valve controlling module may output the control signal to the fuel injection valve to perform a third fuel injection in which the fuel is injected after passing a given period from the second fuel portion injection. The fuel injection valve controlling module may set an execution timing of the first fuel portion injection to be on the intake stroke, and execution timings of the second and third fuel injections to be on the compression stroke.

BRIEF DESCRIPTION OF THE DRAWINGS

FIGS. 9A and 9B are conceptual diagrams illustrating a change in flow over time of the mixture gas distribution using the swirl flow.

DETAILED DESCRIPTION OF THE DISCLOSURE

Hereinafter, embodiments of the present disclosure are described in detail with reference to the accompanying drawings. Note that the following description is essentially nothing more than an illustration, and is not to limit the present disclosure, an application thereof, or a usage thereof.

<SPCCI Combustion>

The present inventors considered a combustion mode in which SI (Spark Ignition) combustion and CI (Compression Ignition) combustion are combined. The SI combustion is combustion accompanying flame propagation which starts by forcibly igniting mixture gas inside a combustion chamber. The CI combustion is combustion which starts by the mixture gas inside the combustion chamber self-igniting by being compressed. In the combustion mode combined the SI combustion and the CI combustion, the mixture gas inside the combustion chamber is forcibly ignited to start its combustion through flame propagation, and heat generated by the SI combustion and pressure increase thereby cause combustion of unburned mixture gas inside the combustion chamber by compression ignition. Hereinafter, this combustion mode is referred to as "SPCCI (SPark Controlled Compression Ignition) combustion.

In the combustion caused by compression ignition, the timing of the compression ignition changes greatly if the temperature inside the combustion chamber varies before the compression starts. In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the timing of compression ignition is controlled. The SPCCI combustion controls the CI combustion with the SI combustion.

The SI combustion through flame propagation causes a relatively gentle pressure increase compared to the CI combustion, thus reducing the combustion noise. Further, the CI combustion shortens the combustion period compared to the SI combustion, which is advantageous in improving fuel efficiency.

<Specific Example of Engine>

Figure 1:
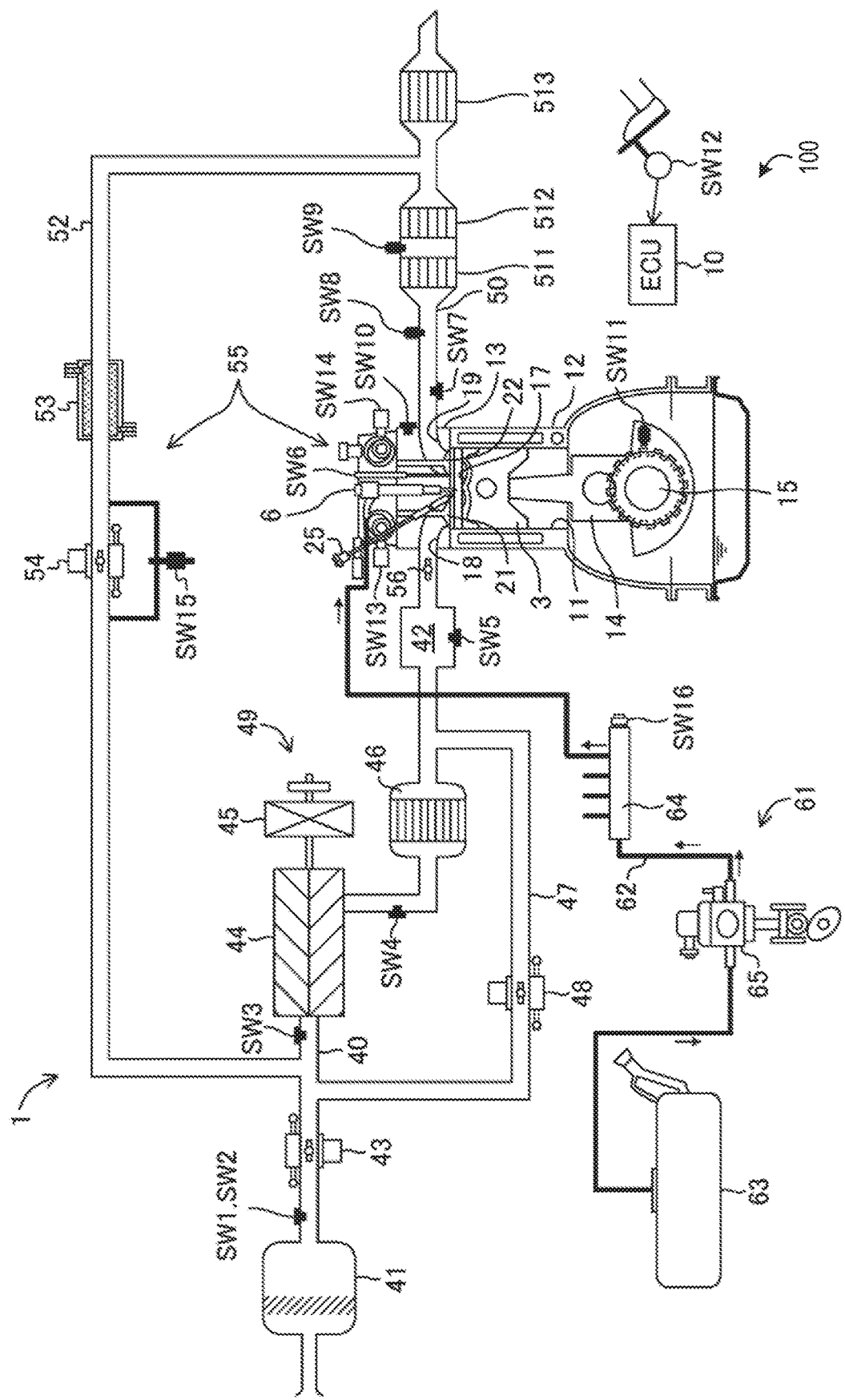
FIG. 1 is a diagram illustrating a configuration of an engine, in which an intake side is on the left side and an exhaust side is on the right side of the drawing sheet.

FIG. 1 shows an overall configuration of an engine to which the combustion art of this SPCCI combustion is applied. The engine 1 is a four-stroke engine which is operated by a combustion chamber 17 repeating intake stroke, compression stroke, expansion stroke and exhaust stroke. The engine 1 is mounted on a four-wheel automobile. The automobile travels by the operation of the engine 1. Fuel of the engine 1 is gasoline in this embodiment. The gasoline may contain bioethanol etc. The fuel of the engine 1 may be any kind of fuel as long as it is liquid fuel containing at least gasoline.

Figure 2:
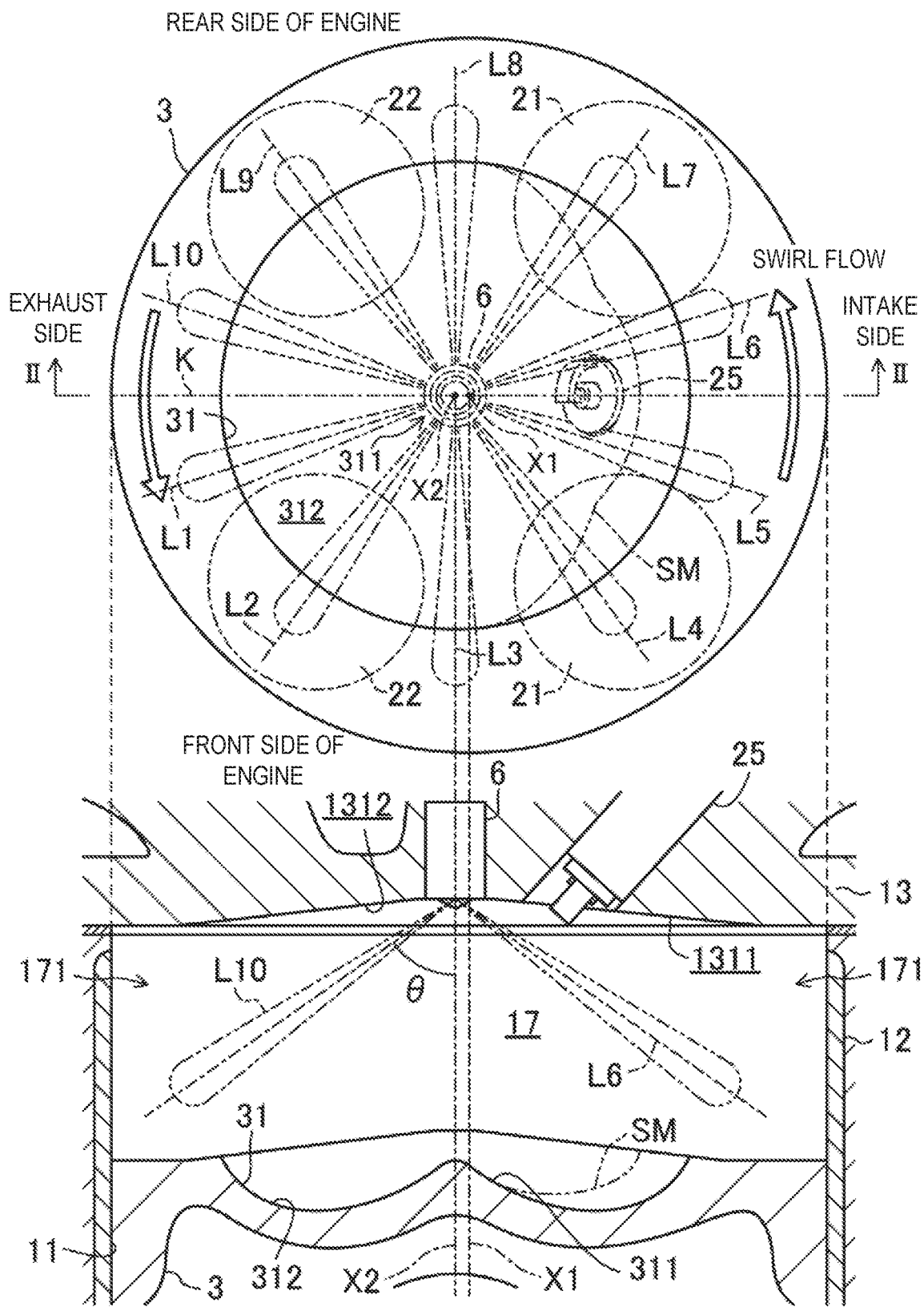
FIG. 2 is a diagram illustrating a structure of a combustion chamber, in which the upper part is a plan view of the combustion chamber and the lower part is a II-II cross-sectional view.

The engine 1 includes a cylinder block 12 and a cylinder head 13 placed on the cylinder block 12. The cylinder block 12 is formed therein with a plurality of cylinders 11. In FIGS. 1 and 2, only one cylinder 11 is illustrated. The engine 1 is a multi-cylinder engine.

A piston 3 is reciprocatably inserted in each cylinder 11. The piston 3 is coupled to a crankshaft 15 via a connecting rod 14. The piston 3 defines the combustion chamber 17 together with the cylinder 11 and the cylinder head 13. Note that the definition of "combustion chamber" is not limited to a space formed when the piston 3 is at a top dead center on compression stroke (CTDC) but may be broad. That is, "combustion chamber" may mean any space formed by the piston 3, the cylinder 11, and the cylinder head 13 regardless of the position of the piston 3.

An upper surface of the piston 3, that is a bottom surface of the combustion chamber 17, is flat. The piston 3 is dented in its upper surface to form a cavity 31. The cavity 31 is arranged opposing to an injector 6 described later.

The cavity 31 has a convex section 311. The convex section 311 is slightly offset from a center axis X1 of the cylinder 11 to an exhaust side. The convex section 311 has a substantially conical shape. The convex section 311 extends upwardly along an injection axis X2 (an axis passing through the center of injection of the injector 6) parallel to the center axis X1 of the cylinder 11, from the bottom of the cavity 31. An upper end of the convex section 311 is located at substantially the same height as that of an upper surface of the cavity 31.

A circumferential side face of the cavity 31 extends from a bottom surface of the cavity 31 toward an opening surface of the cavity 31, inclined with respect to the axis X2. An inner diameter of the cavity 31 gradually increases from the bottom surface of the cavity 31 to the opening surface of the cavity 31.

The cavity 31 has a dented section 312 formed to surround the convex section 311 entirely. The dented section 312 has a symmetric shape with respect to the injection axis X2. A circumferential side face of the dented section 312 extends from the bottom surface of the cavity 31 to the opening surface of the cavity 31, inclined with respect to the injection axis X2 (i.e., constituting the circumferential side face of the cavity 31). An inner diameter of the cavity 31 at the dented section 312 gradually increases from the bottom surface of the cavity 31 to the opening surface of the cavity 31.

As illustrated in the lower part of FIG. 2, a lower surface of the cylinder head 13, that is, a ceiling surface of the combustion chamber 17, is formed by an inclined surface 1311 and an inclined surface 1312. The inclined surface 1311 inclines upwardly toward the axis X2 from the intake side. The inclined surface 1312 inclines upwardly toward the axis X2 from the exhaust side. The ceiling surface of the combustion chamber 17 has a so-called pent-roof shape.

Note that the shape of the combustion chamber 17 is not limited to that illustrated in FIG. 2. The shapes of the cavity 31, the upper surface of the piston 3, the ceiling surface of the combustion chamber 17, etc. are suitably changeable. For example, the dented section 312 of the cavity 31 may be omitted. Further, the cavity 31 may have a symmetric shape with respect to the center axis X1 of the cylinder 11. The inclined surfaces 1311 and 1312 may have a symmetric shape with respect to the center axis X1 of the cylinder 11. As indicated by a virtual line SM of FIG. 2, the cavity 31 may be formed so that the intake side is smaller than the exhaust side. In this manner, the mixture gas is easily transportable to around a spark plug 25.

The geometric compression ratio of the engine 1 is set to be between 13:1 and 20:1, preferably 14:1 or above. As described later, within some of operating ranges of the engine 1, the engine 1 performs an SPCCI combustion operation in which the SI combustion and the CI combustion are combined. In the SPCCI combustion operation, the CI combustion is performed by utilizing heat generated by the SI combustion and pressure increase caused by flame propagation. In this engine 1, it is unnecessary to significantly raise the temperature of the combustion chamber 17 when the piston 3 reaches CTDC, for the mixture gas to self-ignite (i.e., the compression end temperature). That is, although the engine 1 performs the CI combustion, its geometric compression ratio is set relatively small. Lowering the geometric compression ratio is advantageous in reducing a cooling loss and a mechanical loss. For example, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

Figure 3:
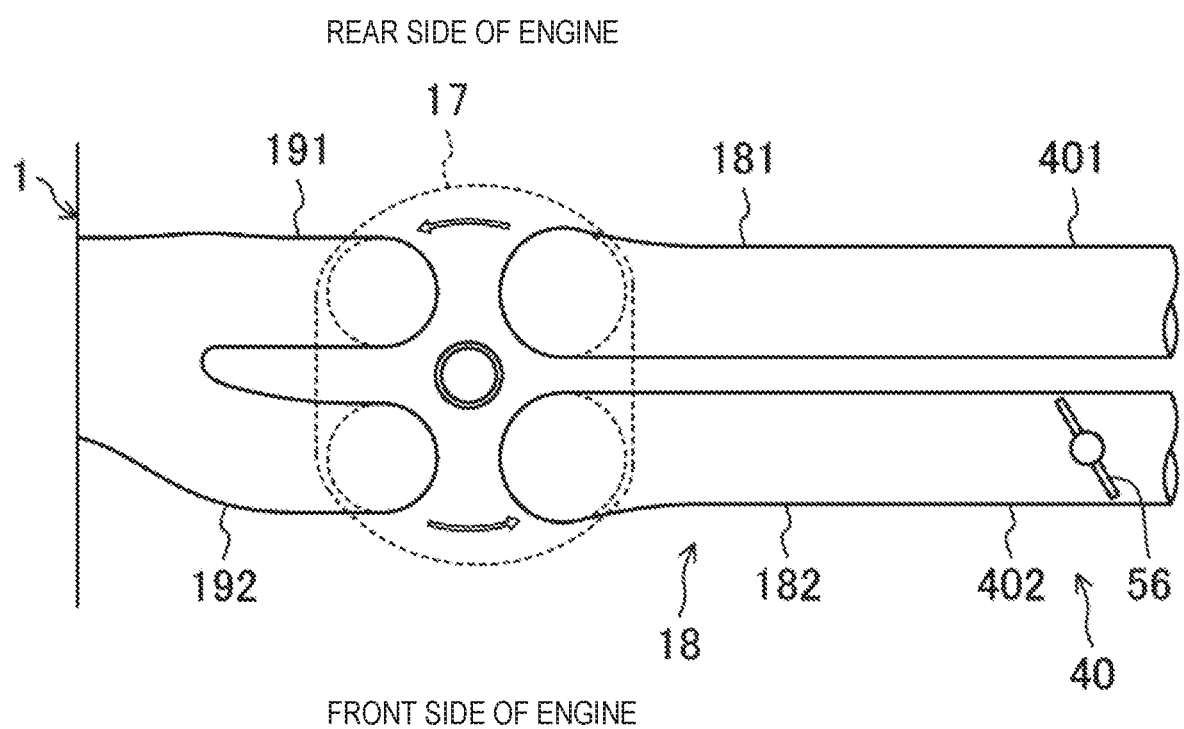
FIG. 3 is a plan view illustrating structures of the combustion chamber and an intake system, in which the intake side is on the right side and the exhaust side is on the left side of the drawing sheet.

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has such a shape that a tumble flow is formed in the combustion chamber 17.

Figure 4:
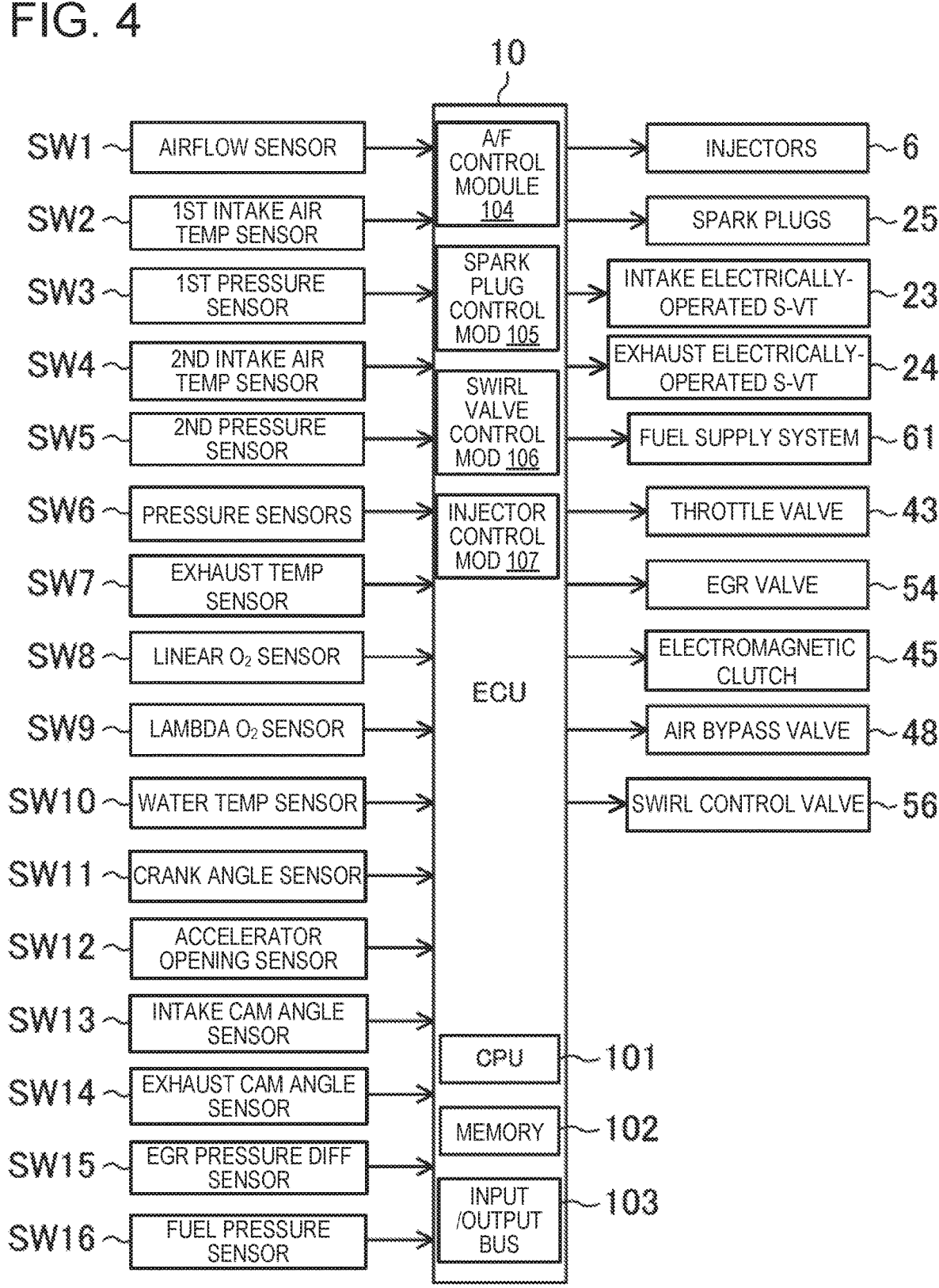
FIG. 4 is a block diagram illustrating a configuration of a control device for the engine.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the operating mechanism of the intake valve 21 may have a hydraulically-operated S-VT instead of the electrically-operated S-VT.

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17. An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the operating mechanism of the exhaust valve 22 may have a hydraulically-operated S-VT instead of the electrically-operated S-VT.

The engine 1 adjusts the length of an overlap period of an open timing of the intake valve 21 and a close timing of the exhaust valve 22 by the intake electrically-operated S-VT 23 and the exhaust electrically-operated S-VT 24. Thus, hot burned gas is enclosed within the combustion chamber 17. That is, internal EGR (Exhaust Gas Recirculation) gas is introduced into the combustion chamber 17. Further, by adjusting the length of the overlap period, residual gas in the combustion chamber 17 is scavenged.

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect, so as to be oriented into the combustion chamber 17. As illustrated in FIG. 2, the injector 6 is disposed so that its injection axis X2 is located parallel to the center axis X1 of the cylinder. The injection axis X2 of the injector 6 coincides with the position of the convex section 311 of the cavity 31. The injector 6 is oriented toward the cavity 31. Note that the injection axis X2 of the injector 6 may coincide with the center axis X1 of the cylinder 11. Also in this case, it is desirable that the injection axis X2 of the injector 6 coincides with the position of the convex section 311 of the cavity 31.

Although not illustrated in detail, the injector 6 is constructed by a multi-port fuel injection valve having a plurality of nozzle ports. As illustrated by two-dotted chain lines in FIG. 2, the injector 6 injects the fuel so that it radially spreads obliquely downward from the radial center of a ceiling portion of the combustion chamber 17. An injection angle θ of each nozzle port with respect to the injection axis X2 of the injector 6 is within 30 and 60 degrees, preferably 45 degrees. In this configuration example, the injector 6 has ten nozzle ports, and the nozzle ports are arranged at an even angular interval in the circumferential direction. Note that the number of nozzle ports is not limited to ten. For example, this number is suitably settable between 8 and 16.

The axes (center lines L5 and L6) of the nozzle ports do not circumferentially overlap with the spark plug 25 described later. That is, the spark plug 25 is sandwiched between the axes L5 and L6 of two adjacent nozzle ports. Thus, the fuel spray injected from the injector 6 is prevented from directly hitting the spark plug 25 and wetting an electrode.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is able to supply the fuel at a high pressure of 30 MPa or higher to the injector 6. A highest fuel pressure of the fuel supply system 61 may be, for example, about 200 MPa. The pressure of the fuel supplied to the injector 6 may be changed according to an operating state of the engine 1. Note that the structure of the fuel supply system 61 is not limited to the above structure.

The spark plug 25 is attached to the cylinder head 13 for each cylinder 11. The spark plug 25 forcibly ignites the mixture gas in the combustion chamber 17. In this configuration example, as illustrated in FIG. 2, the spark plug 25 is disposed at an intake side of the cylinder 11 with respect to the center axis X1 of the cylinder 11. The spark plug 25 is located adjacent to the injector 6. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13. The electrode of the spark plug 25 is located near the ceiling surface of the combustion chamber 17 to be oriented toward inside the combustion chamber 17.

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. A part of the intake passage 40 downstream of the surge tank 42 forms independent passages branching for the respective cylinders 11. Downstream ends of the independent passages communicate with the intake ports 18 of the cylinders 11, respectively.

A throttle valve 43 (one example of an air-fuel ratio control valve) is disposed in the intake passage 40 between the air cleaner 41 and the surge tank 42. The throttle valve 43 adjusts an introduction amount of fresh air into the combustion chamber 17 by adjusting an opening thereof.

A booster 44 is disposed in the intake passage 40 downstream of the throttle valve 43. The booster 44 boosts the gas to be introduced into the combustion chamber 17. In this configuration example, the booster 44 is a supercharger which is driven by the engine 1. The booster 44 may be, for example, of a Roots type. The booster 44 may have any structure, for example, of a Lisholm type, a Vane type, or a centrifugal type.

An electromagnetic clutch 45 is interposed between the booster 44 and the engine 1. The electromagnetic clutch 45 controls the flow of driving force between the booster 44 and the engine 1, for example, it transmits the driving force from the engine 1 to the booster 44 or interrupts the transmission of the driving force therebetween. As is described later, by an ECU (Engine Control Unit) 10 switching the connection/ disconnection of the electromagnetic clutch 45, the on/off of the booster 44 is switched. In this engine 1, boosting the gas to be introduced into the combustion chamber 17 by the booster 44 and not boosting the same by the booster 44 are switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), the gas passed through the booster 44 partially flows back upstream of the booster 44 through the bypass passage 47. By controlling an opening of the air bypass valve 48, the backflow amount is adjusted, which leads to adjusting the boosting pressure of the gas introduced into the combustion chamber 17. In this configuration example, a boosting system 49 is comprised of the booster 44, the bypass passage 47, and the air bypass valve 48.

The engine 1 has a swirl generating part which generates a swirl flow in the combustion chamber 17. As illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively. The SCV 56 is an opening regulating valve which is capable of adjusting an opening of a cross section of the secondary passage. When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow in the combustion chamber 17 becomes strong. When the opening of the SCV 56 is large, the flow rates of the intake air into the combustion chamber 17 from the first intake port 181 and the second intake port 182 become substantially even, and thus the swirl flow in the combustion chamber 17 becomes weak. When the SCV 56 is fully opened, a swirl flow does not occur. Note that the swirl flow circulates in the counter-clockwise direction in FIG. 3 as indicated by the arrows (also see the white outlined arrows in FIG. 2).

Note that alternatively/additionally to attaching the SCV 56 to the intake passage 40, the swirl generating part may adopt a structure in which the open periods of the two intake valves 21 are varied so as to introduce the intake air into the combustion chamber 17 from only one of the intake valves 21. By opening only one of the two intake valves 21, the intake air is introduced unevenly into the combustion chamber 17 and, thus, the swirl flow is generated in the combustion chamber 17. Alternatively, the shapes of the intake ports 18 may be devised so that the swirl generating part generates the swirl flow in the combustion chamber 17.

Since the intake port 18 of this engine 1 is a tumble port, an inclined swirl flow having a tumble component and a swirl component is formed in the combustion chamber 17. An inclination angle of the inclined swirl flow is generally about 45 degrees with respect to an orthogonal plane to the center axis X1 of the cylinder 11, but it is suitably set, for example, between 30 and 60 degrees according to the specifications of the engine 1.

An exhaust passage 50 is connected to a side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having a plurality of catalytic converters is disposed in the exhaust passage 50. Although not illustrated, the catalytic converter on the upstream side is disposed in an engine room and has a three-way catalyst 511 and a GPF (Gasoline Particulate Filter) 512. The catalytic converter on the downstream side is disposed outside the engine room and has a three-way catalyst 513. Note that the exhaust gas purification system is not limited to have the illustrated structure.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44.

A water-cooling type EGR cooler 53 is disposed in the EGR passage 52. The EGR cooler 53 cools the burned gas. An EGR valve 54 (one example of an air-fuel ratio control valve) is also disposed in the EGR passage 52. The EGR valve 54 adjusts the flow rate of the burned gas in the EGR passage 52. By adjusting an opening of the EGR valve 54, the recirculation amount of the cooled burned gas (i.e., external EGR gas) is adjusted.

In this configuration example, an EGR system 55 includes the external EGR system including the EGR passage 52 and the EGR valve 54, and an internal EGR system including the intake electrically-operated S-VT 23 and the exhaust electrically-operated S-VT 24 described above.

A control system 100 includes the ECU 10 configured to operate the engine 1. As illustrated in FIG. 4, the ECU 10 is a control unit based on a well-known microcomputer and includes a processor (e.g., central processing unit, CPU) 101 configured to execute program(s), a memory 102 comprised of RAM(s) (Random Access Memory) and ROM(s) (Read Only Memory) and configured to store the program(s) and data, an input/output bus 103 configured to input and output electric signals, an air-fuel ratio controlling module 104, a spark plug controlling module 105, a swirl control valve controlling module 106, and a fuel injection valve controlling module 107. The processor 101 is configured to execute these modules, stored in the memory 102 as software, to perform their respective functions. The ECU 10 is one example of a "control unit."

As illustrated in FIGS. 1 and 4, various sensors SW1 to SW16 are connected to the ECU 10. The sensors SW1 to SW16 output detection signals to the ECU 10. The sensors include the following sensors.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 downstream of the connecting position with the EGR passage 52 and upstream of the booster 44, and configured to detect pressure of the gas flowing into the booster 44, a second intake air temperature sensor SW4 disposed in the intake passage 40 downstream of the booster 44 and upstream of the connecting position of the bypass passage 47, and configured to detect a temperature of the gas flowed out of the booster 44, a second pressure sensor SW5 attached to the surge tank 42 and configured to detect pressure of the gas at a position downstream of the booster 44, pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the upstream catalytic converter and configured to detect an oxygen concentration within the exhaust gas, a lambda $O_2$ sensor SW9 disposed in the upstream catalytic converter downstream of the three-way catalyst 511 and configured to detect the oxygen concentration within the exhaust gas, a water temperature sensor SW10 attached to the engine 1 and configured to detect a temperature of the cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect pressure of the fuel to be supplied to the injector 6.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56. For example, the ECU 10 adjusts the boosting pressure by controlling an opening of the air bypass valve 48 based on a pressure difference between the upstream side and the downstream side of the booster 44, which is obtained from the detection signals of the first pressure sensor SW3 and the second pressure sensor SW5. Further, the ECU 10 adjusts an external EGR gas amount introduced into the combustion chamber 17 by controlling the opening of the EGR valve 54 based on the pressure difference between the upstream and downstream positions of the EGR valve 54 obtained from the detection signal of the EGR pressure difference sensor SW15. Details of the control of the engine 1 by the ECU 10 are described later.

(Operating Range of Engine)

Figure 5A:
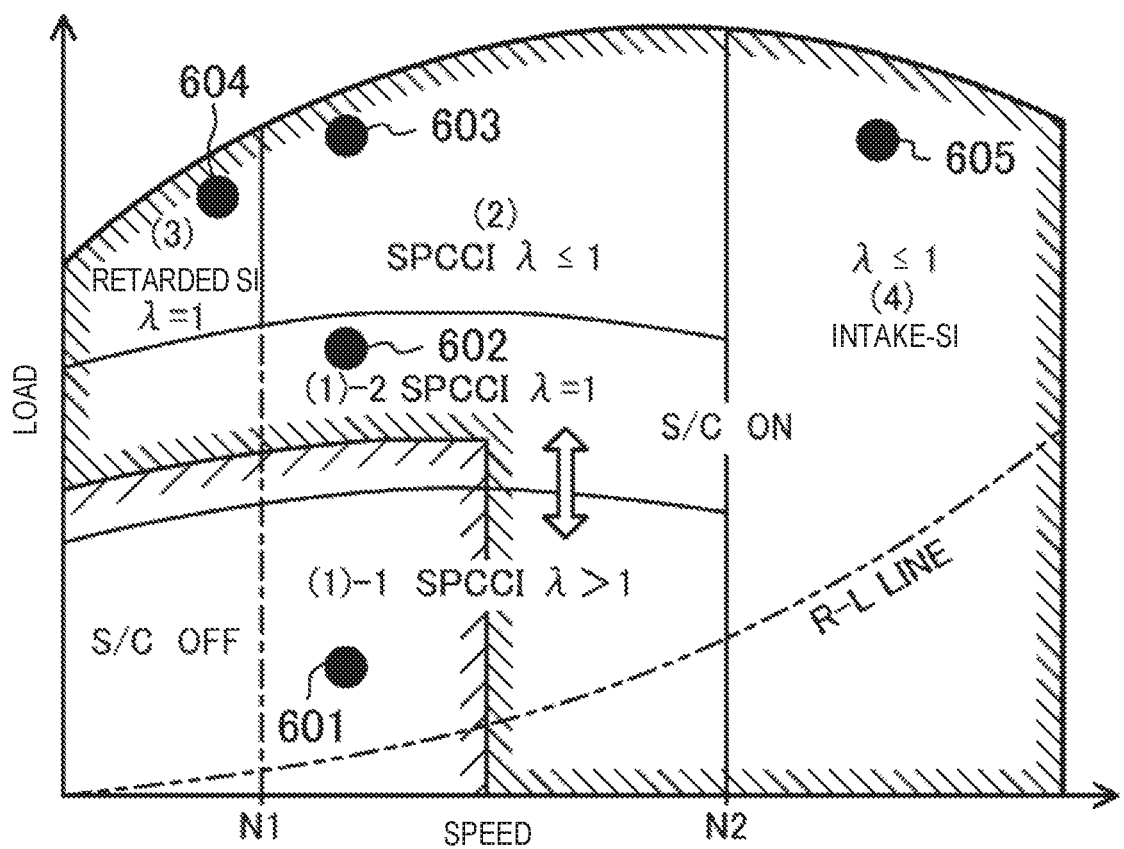
FIG. 5A is a chart illustrating operating ranges of the engine.

FIG. 5A illustrates operating ranges of the engine 1. The operating ranges of the engine 1 are divided into five ranges in terms of the engine load and the engine speed. For example, the five ranges include: a low load range (1)-1 including an idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in a high load range including a full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3).

Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 5A, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm. The high-load medium-speed range (2) may be a range where combustion pressure exceeds 900 kPa. Note that the two-dotted chain line in FIG. 5A indicates the road-load line of the engine 1.

Figure 5B:
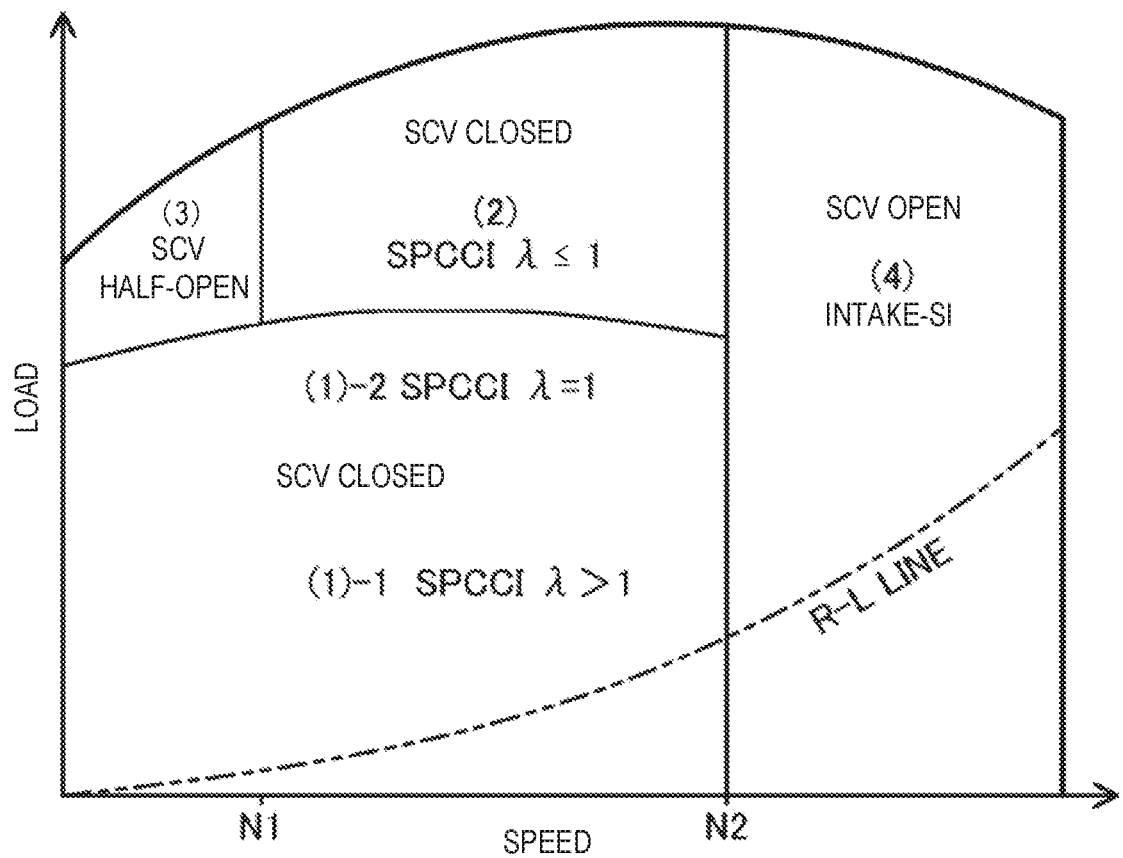
FIG. 5B is a chart illustrating an opening of a swirl control valve in each operating range of the engine.

FIG. 5B is a chart illustrating an opening control on the SCV 56 in each operating range of the engine 1 illustrated in FIG. 5A. For example, within the low load range (1)-1, the medium load range (1)-2, and the high-load medium speed range (2), the opening of the SCV 56 is controlled to be substantially fully closed so as to increase a swirl ratio. Within the low speed range (3), the opening of the SCV 56 is controlled to open by about half so as to lower the swirl ratio. Within the high speed range (4), the opening of the SCV 56 is controlled to substantially fully open so that the swirl flow is not formed.

Mainly for improving fuel efficiency and exhaust gas performance, the engine 1 performs combustion by compression self-ignition within the low load range (1)-1, the medium load range (1)-2, and the high-load medium-speed range (2). Further, the engine 1 performs combustion by spark-ignition within the other ranges, specifically, the high-load low-speed range (3) and the high speed range (4). Hereinafter, the operation of the engine 1 within each of the low load range (1)-1, the medium load range (1)-2, the high-load medium-speed range (2), the high-load low-speed range (3), and the high speed range (4) is described in detail with reference to the fuel injection timing and the ignition timing illustrated in FIG. 6.

(Low Load Range (1)-1)

When the engine 1 is operating within the low load range (1)-1, the fuel injection amount is small and the internal temperature of the combustion chamber 17 is also low. Therefore, the CI combustion triggered by self-ignition upon reaching a given pressure and temperature cannot be performed stably. Since the fuel amount is small, the spark ignition is difficult to be carried out and the SI combustion becomes unstable. The air-fuel ratio (A/F) inside the entire combustion chamber 17 within the low load range of the engine 1 is, for example, between 30:1 and 40:1.

Figure 7:
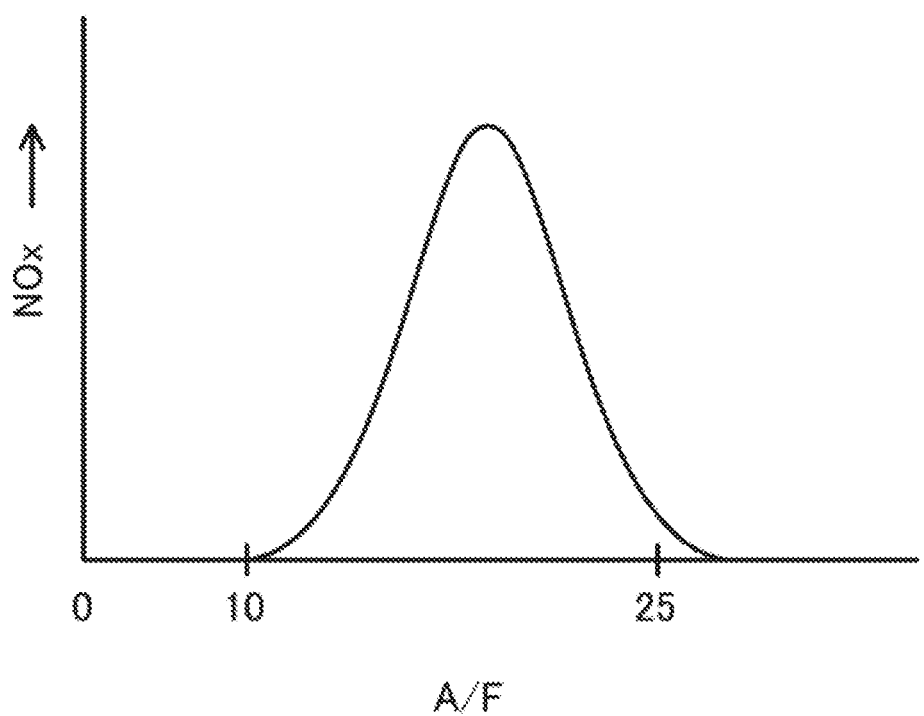
FIG. 7 is a conceptual chart illustrating a relationship between a generation amount of $NO_x$ and A/F in combustion.

FIG. 7 shows a relationship between the generation amount of $NO_x$ and A/F during combustion. Around a stoichiometric air-fuel ratio (A/F=14.7:1), since the combustion temperature becomes high, a large amount of $NO_x$ is generated. The generation of $NO_x$ is reduced by bringing the engine into an oxygen insufficient state where A/F falls below 10:1, the fuel concentration is high, and the amount of air is insufficient for the fuel, or an air excess state where A/F exceeds 30:1, the fuel concentration is low, and the amount of air is excessive for the fuel.

Therefore, conventionally, while the engine is operating within the low load range, for example, a stratified lean combustion in which the rich mixture gas in the oxygen insufficient state is formed around the spark plug 25 to cause a fire, and a lean mixture gas in the air excess state is formed around the rich mixture gas, and they are compressed to ignite, is performed.

However, in such a stratified lean combustion, the mixture gas of which A/F is between 10:1 and 25:1 at which a large amount of $NO_x$ is generated occurs between the rich mixture gas and the lean mixture gas. Therefore, $NO_x$ generation cannot be reduced.

Even though the lean mixture gas of which A/F exceeds 30:1 is spark-ignitable, its flame propagation is slow and the combustion does not progress, thus the stable SI combustion cannot be performed. On the other hand, if A/F is about 25:1 (20:1 to 35:1), the stable SI combustion is performed and generation of $NO_x$ is reduced.

Therefore, within the low load range (1)-1, the engine 1 performs the SPCCI combustion in which the SI combustion and the CI combustion are combined.

Further, by applying the control art of the mixture gas distribution using the swirl flow, the stable SPCCI combustion is performed within the low load range of the engine 1 and combustion with low $NO_x$ and low fuel consumption is achieved.

For example, a small amount of fuel with which lean mixture gas of which A/F exceeds 30:1 is formed inside the combustion chamber 17 entirely, is injected into the combustion chamber 17, and a stratified mixture gas distribution having a section which is located in a center portion of the combustion chamber 17 provided with the spark plug, and causes the fire (e.g., A/F is between 20:1 and 35:1), and a section which is located in an outer circumferential portion of the combustion chamber 17, and is compressed to ignite by combustion pressure and combustion heat of the fire (e.g., A/F is between 35:1 and 50:1), is formed inside the combustion chamber 17 at a timing of ignition. Next, the control of the mixture gas distribution using the swirl flow will be described in detail.

(Control of Mixture Gas Distribution)

The present inventors focused on the swirl flow to accurately control the mixture gas distribution within the combustion chamber. The swirl flow is a whirling flow (lateral vortex) formed orthogonal to the center axis of the cylinder. Therefore, unlike a tumble flow (vertical vortex) formed in a direction in which the volume of the combustion chamber changes, it barely receives any influence of the change in volume of the combustion chamber and the engine speed.

For this reason, the swirl flow, more precisely a swirl component turning orthogonal to the center axis of the cylinder, is at a relatively stable flow rate even if the volume of the combustion chamber changes or the operating condition of the engine changes. Therefore, by injecting the fuel into the combustion chamber and controlling a change of the fuel spray over time by using the swirl flow, the mixture gas distribution within the combustion chamber at a given timing after the fuel injection is accurately controlled.

Figure 8:
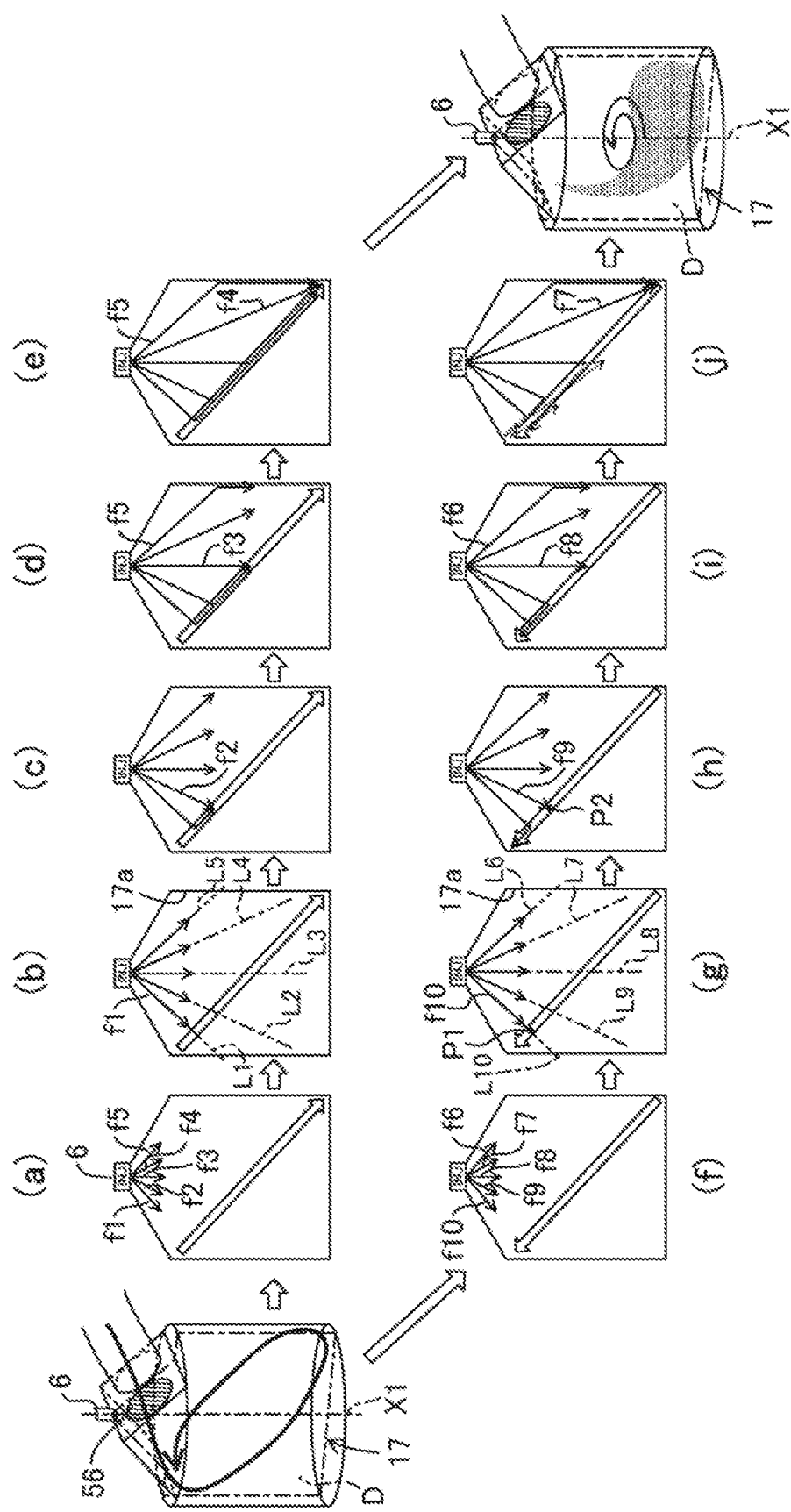
FIG. 8 shows conceptual diagrams illustrating a control of a mixture gas distribution using a swirl flow.

This is described in detail with reference to FIG. 8. The left end part of FIG. 8 schematically shows the combustion chamber 17 at a given timing on the intake stroke at which the volume of the combustion chamber 17 is relatively large. As described above, the SCV 56 (constituting a swirl generating part) which causes the swirl flow inside the combustion chamber 17 is disposed in an upper portion of the combustion chamber 17. The injector 6 (constituting a fuel injection valve) which injects the fuel into the combustion chamber 17 is disposed in a center section of the upper portion of the combustion chamber 17. The injector 6 injects the fuel downward from the ten nozzle ports arranged at an even interval in the circumferential direction, simultaneously at an injection angle of 30 to 60 degrees, preferably 45 degrees, from the injection axis X2 to spread radially. Center lines L1 to L10 of the sprays of the fuel injected from the respective nozzle ports are illustrated in FIG. 2.

The center lines L1 to L5 of the fuel sprays are located at the front side of the engine 1 and the center lines L6 to L10 of the fuel sprays are located at the rear side of the engine 1. In this drawing, the center line L1 of the fuel spray is located closest to the exhaust side among the center lines L1 to L5 of the fuel sprays at the front side of the engine 1, at substantially 18 degrees to the front side of the engine 1 from a reference line K passing through the injection axis X2 which is a bisector between the two intake valves 21.

The center lines L1 to L5 of the fuel sprays located at the front side of the engine 1 and the center lines L6 to L10 of the fuel sprays located at the rear side of the engine 1 are arranged line symmetrically with respect to the reference line K when seen in the direction of the injection axis X2. The center lines L1 to L10 of the fuel sprays are arranged counter-clockwise in this order, at an even interval of substantially 36 degrees centering on the injection axis X2.

The ECU 10 controls the opening of the SCV 56 to have a narrow opening to introduce the intake air unevenly into the combustion chamber 17. Thus, a swirl flow inclined with respect to the center axis X1 (the inclined swirl flow, constituted by the swirl component and the tumble component) is formed inside the combustion chamber 17.

For example, by controlling the SCV 56 to have a narrow opening, a relatively large amount of intake air flows into the combustion chamber 17 from the first intake port 181. Thus, as indicated by the arrows in FIG. 3, a counter-clockwise swirling flow is formed inside the combustion chamber 17. In combination with the intake port 18 which is the tumble port, the inclined swirl flow is formed. As indicated by the arrow in the left end part of FIG. 8, the inclined swirl flow formed by the intake air flowed into the combustion chamber 17 from the first intake port 181 rotates large, obliquely downward at the front side of the engine 1 through the upper portion of the exhaust side of the combustion chamber 17, then runs through the lower portion of the intake side of the combustion chamber 17, rotates large, obliquely upward at the rear side of the engine 1, and then returns back to the upper portion of the exhaust side of the combustion chamber 17.

A reference character D illustrated in the left end part indicates a vertical cross section evenly dividing the internal space of the combustion chamber 17 into two portions in the front-to-rear direction of the engine 1. The five drawings (a) to (e) in the upper row schematically illustrate a state change in the upstream side of the inclined swirl flow (simplified to "the upstream side" for the sake of convenience), corresponding to the flow at the front side (a front side of the drawing) of the engine 1 defined by the vertical cross section D, over time after the fuel injection as indicated by arrows from the left end. The five drawings (f) to (j) in the lower row schematically illustrate a state change in the downstream side of the inclined swirl flow, corresponding to the flow at the rear side (a back side of the drawing) of the engine 1 defined by the vertical cross section D, over time after the fuel injection as indicated by arrows from the left end.

The outlined arrows in these drawings (a) to (j) show a main stream of the inclined swirl flow generated inside the combustion chamber 17 (a center portion of the flow with strong stream, hereinafter may simply be referred to as "the swirl flow"). Note that the main stream of the swirl flow has therearound a weak side stream flowing in the same direction as the main stream. Although the flow of the fuel spray may be influenced by the side stream, since the current direction of the side stream is the same as the main stream and also the main stream is more intense, even when the fuel spray is influenced, the main stream has a dominant influence in the end. Therefore, a later-described phenomenon in which the mixture gas distribution is formed by the swirl flow rarely changes due to the side stream.

The drawing (a) in the upper row illustrates the upstream side of the swirl flow immediately after the fuel is injected from the injector 6. At the upstream side of the swirl flow, five fuel portions f1 to f5 are injected at the same timing as fuel portions f6 to f10 at the downstream side of the swirl flow.

As illustrated in the drawing (b), the fuel portion f1 injected from the nozzle port closest to the swirl flow (having the shortest reach distance) among all the fuel portions injected toward the swirl flow at the upstream side reaches the swirl flow first. Then, as illustrated in the drawing (c), the spray of the fuel portion f2 having the second shortest reach distance reaches the swirl flow downstream of a section in which the spray of the fuel portion f1 reaches the swirl flow. Here, the spray of the fuel portion f1 moves with the swirl flow and merges with the spray of the fuel portion f2. Then, as illustrated in the drawing (d), the spray of the fuel portion f3 having the next shortest reach distance reaches the swirl flow. Here, the sprays of the fuel portions f1 and f2 merged first move with the swirl flow and merge with the spray of the fuel portion f3.

Further after, as illustrated in the drawing (e), the spray of the fuel portion f4 having the next shortest reach distance reaches the swirl flow. In this example, the spray of the fuel portion f4 reaches the swirl flow in a lower end portion of the combustion chamber 17. Here, the sprays of the merged fuel portions f1 to f3 move with the swirl flow and merge with the spray of the fuel portion f4.

The injected fuel may reach a wall surface 17*a* of the combustion chamber 17 (fuel portion f5). As illustrated in the drawing (d), the spray of the fuel portion f5 reaches the wall surface 17*a* and then moves therealong. Then, as illustrated in the drawing (e), the spray of the fuel portion f5 also reaches the swirl flow and merges with the sprays of the fuel portions f1 to f4.

That is, the injector 6 injects a plurality of fuel portions (f1 to f4 in the drawing) including first fuel portion and second fuel portion, of which the sprays reach the swirl flow, the spray of the first fuel portion (e.g., f1) reaches the swirl flow, and then the spray of the second fuel portion (e.g., f2) reaches the position to which the spray of the first fuel portion moves by the swirl flow.

Further, the spray of the fuel portion f5, having reached the wall surface 17*a*, also moves along the wall surface 17*a* to reach the swirl flow and merges with the merged spray.

In this manner, the injected fuel portions are merged using the swirl flow and the rich mixture gas at high fuel concentration is formed. In this example, the fuel portions injected from the injector 6 at the upstream side of the swirl flow are all collected to one location.

Meanwhile, the drawing (f) in the lower row illustrates the downstream side of the swirl flow immediately after the fuel is injected from the injector 6. Also at the downstream side of the swirl flow, the fuel portions f6 to f10 are injected at the same timing as the fuel portions f1 to f5 at the upstream side of the swirl flow.

As illustrated in the drawing (g), the spray of the fuel portion f10 injected from the nozzle port closest to the swirl flow (having the shortest reach distance) among all the fuel portions injected toward the swirl flow at the downstream side reaches the swirl flow first (first position P1). Then, as illustrated in the drawing (h), the spray of the fuel portion P9 having the second shortest reach distance reaches the swirl flow upstream of a section in which the spray of the fuel portion f10 reaches the swirl flow (second position P2).

Here, the spray of the fuel portion f10, after reaching the first position P1 but before the spray of the fuel portion f9 reaches the second position P2, moves further downstream from the arrived position (first position P1) of the spray of the fuel portion f10 together with the swirl flow, and moves away from the second position P2. Therefore, even when the spray of the fuel portion P9 moves with the swirl flow thereafter, since the spray of the fuel portion f10 moves with the swirl flow at a position separated from the spray of the fuel portion f9 to the further downstream side of the swirl flow (enter the upstream side again), while moving by the swirl flow, the spray of the fuel portion P9 is kept away from the spray of the fuel portion f10. Thus, the mixture gas with uneven fuel concentration is formed. Then, as illustrated in the drawing (i), the spray of the fuel portion f8 having the second shortest reach distance reaches the swirl flow upstream of a section in which the spray of the fuel portion P9 reaches the swirl flow. Here, the spray of the fuel portions f10 and f9 merged first moves with the swirl flow and then further moves downstream from their respective arrived positions.

In other words, the injector 6 injects a plurality of fuel portions (f10 to f8 in the drawing) including first fuel portion and second fuel portion, of which the sprays reach the swirl flow, and when the position at which the spray of the first fuel portion (e.g., f10) reaches the swirl flow is the first position P1 and the position at which the spray of the second fuel portion (e.g., f9) reaches the swirl flow is the second position P2, the spray of the first fuel portion, after reaching the first position P1, moves away from the second position by the swirl flow before the spray of the second fuel portion reaches the second position P2.

In this manner, the injected fuel portions are suitably diffused using the swirl flow, and homogeneous mixture gas within which the fuel spreads thin is formed. In this example, approximately 30% of the fuel injected by the injector 6 diffuses.

Further after, as illustrated in the drawing (j), the spray of the fuel portion f7 having the next shortest reach distance reaches the swirl flow. In this example, the spray of the fuel portion f7 reaches the swirl flow in the lower end portion of the combustion chamber 17. Here, the spray of the fuel portion f7 merges with the spray of the fuel portions f1 to f5 of the upstream side of the swirl flow.

Similarly to the upstream side of the swirl flow, the injected fuel may reach the wall surface 17a of the combustion chamber 17 (fuel portion f6). As illustrated in the drawing (i), the spray of the fuel portion f6 reaches the wall surface 17a and then moves therealong. Then, as illustrated in the drawing (j), the spray of the fuel portion f6 also reaches the swirl flow and merges with the spray of the fuel portions f1 to f5 together with the spray of the fuel portion P. That is, in this example, approximately 70% of the fuel injected by the injector 6 merges.

The right end part of FIG. 8 schematically illustrates a state immediately after all the fuel portions injected from the injector 6 reach the swirl flow. As illustrated in this drawing, the fuel injected from the injector 6 forms the mixture gas spreading unevenly along the swirl flow. This mixture gas has a section where the fuel is concentrated and a section where the fuel is spread, and is distributed at different fuel concentrations, i.e., different A/F distributions, depending on the position (mixture gas distribution). The mixture gas distribution moves circumferentially inside the combustion chamber 17 with the swirl flow. Here, the mixture gas distribution deflects toward the center of the combustion chamber 17 while gradually diffusing.

FIGS. 9A and 9B show diagrams of the inside the combustion chamber 17 where the mixture gas distribution moves with the swirl flow, seen from the top of the combustion chamber 17. Then the energy of the swirl flow formed by the introduction of the intake air attenuates by receiving air resistance, and deflects toward the center of the combustion chamber 17 while gradually diffusing. In other words, the mixture gas distribution, which moves with the swirl flow, follows the change in the stream of the swirl flow.

As illustrated in the upper part of FIG. 9A, the mixture gas distribution formed by the collection of the fuel portions f1 to f7 (schematically illustrated by dots) deflects toward the center portion of the combustion chamber 17 while traveling with the swirl flow and further diffusing as indicated by the arrow. Since this mixture gas distribution has a high fuel concentration, at the timing of the combustion start, a relatively rich mixture gas distribution deflected toward the center portion of the combustion chamber 17 is formed as indicated by the dots in the lower part of FIG. 9A.

As illustrated in the upper part of FIG. 9B, the mixture gas distribution formed by the fuel portions f8 to f10 spreading thin and having a low fuel concentration (schematically illustrated by dots) deflects toward the center portion of the combustion chamber 17 while traveling with the swirl flow and further diffusing as indicated by the arrow. Thus, at the timing of the combustion start, as indicated by the dots in the lower part of FIG. 9B, a relatively lean mixture gas distribution spreading in the combustion chamber 17 entirely is formed.

By mixing these mixture gases, a stratified mixture gas distribution including the relatively high fuel concentration section and the relatively low fuel concentration section is formed inside the combustion chamber 17.

As is described later, such a mixture gas distribution is formed using the swirl flow when the fuel injection pressure is between 30 MPa and 120 MPa and the swirl ratio is between 2 and 6.

While the engine 1 is operating, since the piston 3 repeatedly elevates and descends, the volume of the combustion chamber 17 changes accordingly. The swirling angle of the swirl flow with respect to the center axis X1 (corresponding to the inclination of the outlined arrows in FIG. 8) also changes accordingly. However, as described above, the swirling angle of the swirl flow (swirl component) receives little influence thereof. Therefore, even when the volume of the combustion chamber 17 changes, such a mixture gas distribution is formed using the swirl flow.

For example, even when the fuel injection timing is on the compression stroke where the volume of the combustion chamber 17 is relatively small, the similar phenomenon to the timing being on the intake stroke described above occurs. Note that since there is more time until the combustion start timing in the case of the intake stroke than in the case of the compression stroke, at the combustion start timing, the fuel injection on the intake stroke causes the fuel to diffuse more and spread larger inside the combustion chamber 17, and a homogeneous mixture gas distribution with lean fuel concentration is formed. On the other hand, due to the shorter time until the combustion start timing in the case of the compression stroke than in the case of the intake stroke, at the combustion start timing, the fuel injection on the compression stroke causes the fuel to concentrate more and a mixture gas distribution with rich fuel concentration, deflected to the center portion of the combustion chamber 17, is formed.

Therefore, by injecting the fuel into the combustion chamber 17 and controlling the change in the fuel spray over time by using the swirl flow, the stratified mixture gas distribution with different fuel concentrations depending on the position is formed. By adjusting the timing for the injector 6 to inject the fuel, the mixture gas distribution at the combustion start timing is also controllable to have an arrangement or state suitable for the combustion. Further, by combining such plurality of mixture gas distributions, various forms of mixture gas distribution can be formed.

(Fuel Injection Pressure)

In order to control the mixture gas distribution by using the swirl flow, the injector 6 preferably injects the fuel at a pressure between 30 MPa and 120 MPa.

If the injection pressure of the fuel falls below 30 MPa, the flow of the injected fuel becomes excessively weak and diffuses before reaching the swirl flow, and may partially fail to reach the swirl flow. If the injection pressure of the fuel exceeds 120 MPa, the flow of the injected fuel becomes excessively strong and may penetrate the swirl flow. In either case, the fuel cannot suitably be placed on the swirl flow. On the other hand, with the injection pressure between 30 MPa and 120 MPa, the injected fuel is suitably placed on the swirl flow, thus the mixture gas distribution is stably controlled using the swirl flow.

(Intensity of Swirl Flow)

The strong swirl flow is important in controlling the mixture gas distribution into a state suitable for the combustion.

Figure 10:
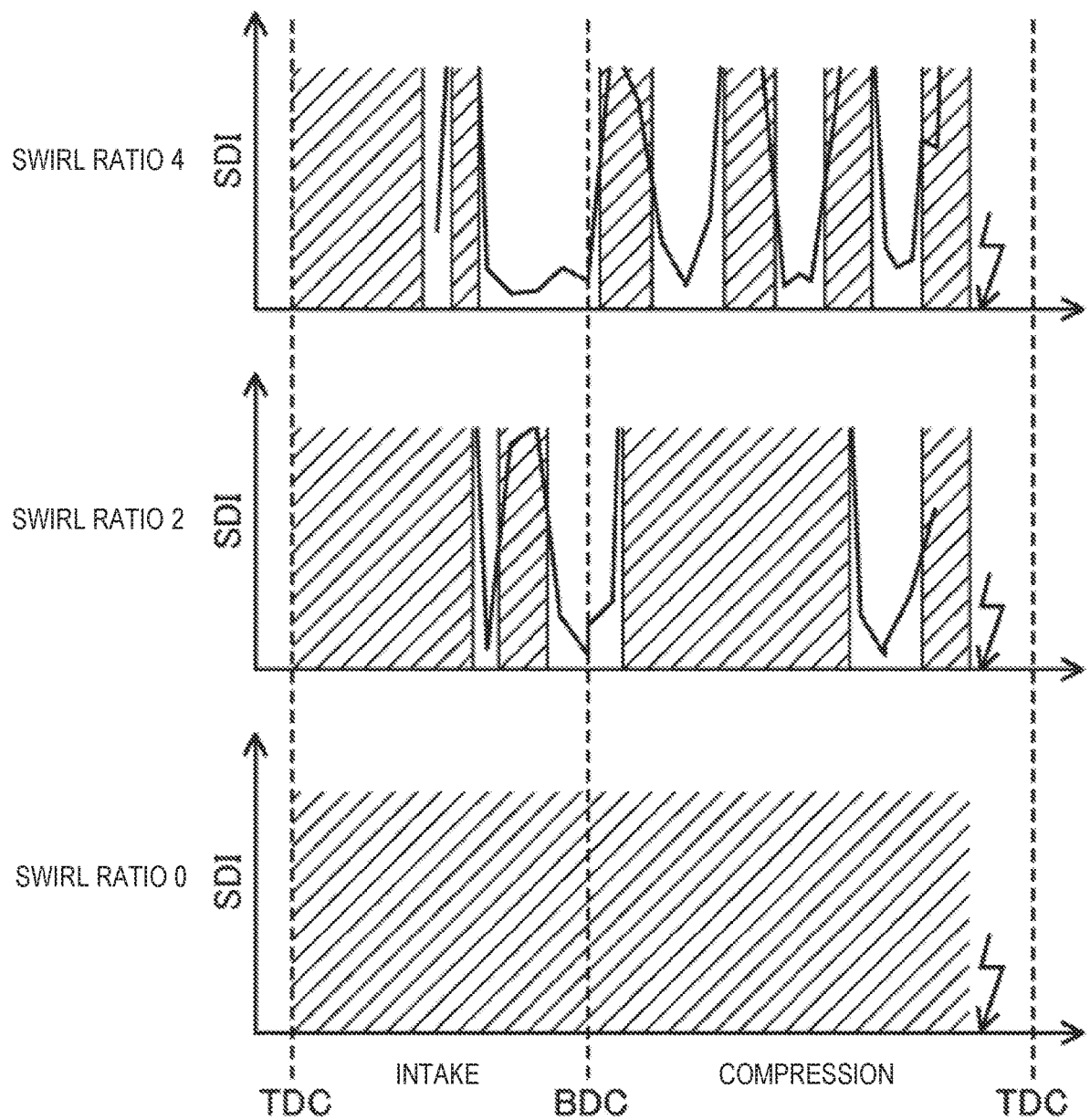
FIG. 10 shows charts illustrating a result of analyzing an influence of the intensity of the swirl flow on ignition stability.

FIG. 10 shows a result of analyzing an influence of the intensity of the swirl flow on stability of ignition. The analysis was conducted under the condition of using the swirl flow as described above. While changing the swirl ratio (an index of the intensity of the swirl flow), an amount of the fuel by which the inside of the combustion chamber 17 becomes lean (A/F of about 30:1) was dividedly injected in a plurality of injections at a given ratio. A first-stage injection was performed at an early stage of the intake stroke (320° C.A before CTDC), and a second-stage injection was performed at a different injection timing. The ignition was performed immediately before CTDC. The vertical axis of FIG. 10 shows combustion stability (SDI) and hatched sections indicate the timing of the second-stage injection at which the ignition becomes unstable.

As a result, a tendency was confirmed that, while the swirl flow is weak (the swirl ratio is small, e.g., the swirl ratio=0), the ignition is unstable (the lower chart of FIG. 10), a timing at which the ignition can stably be performed appears (the middle chart of FIG. 10) when the swirl flow is strong (the swirl ratio is large, e.g., the swirl ratio=2), and the number of such timings and/or a range of such timings increase (the upper chart of FIG. 10) when the swirl flow becomes further stronger (e.g., the swirl ratio=4).

That is, when the swirl flow is weak, the mixture gas distribution cannot be controlled. Further, when the swirl flow is strong, accordingly the number of such timings and/or a range of such timings at which the stable ignition is possible increase, thus the mixture gas distribution becomes controllable at high degree of freedom. Therefore, it is important to form the strong swirl flow in order to control the mixture gas distribution into the suitable state for the combustion.

Thus, when the engine 1 is operating within the low load range (1)-1, the ECU 10 controls the SCV 56 so that the swirl ratio becomes at least 2, preferably 4 or above.

Figure 11:
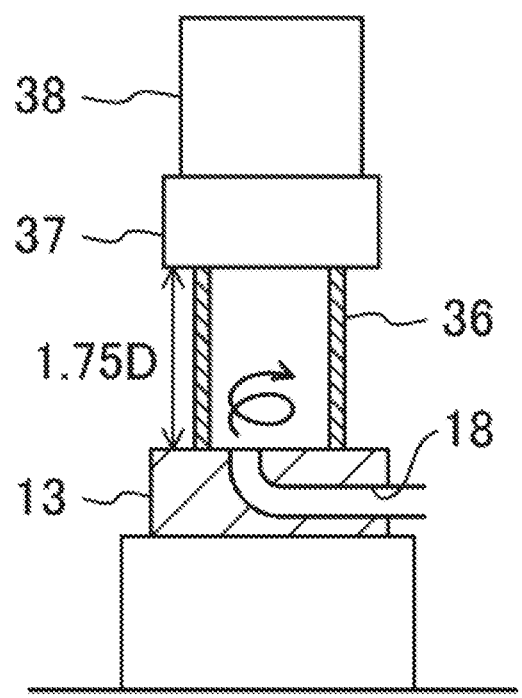
FIG. 11 is a diagram illustrating a rig test device for measuring a swirl ratio.

Here, "swirl ratio" may be defined as a value obtained by measuring an intake flow lateral angular speed for each valve lift, integrating these values, and dividing this integrated value by an engine angular speed. The intake flow lateral angular speed may be obtained based on a measurement using a rig test device illustrated in FIG. 11. Specifically, the device illustrated in FIG. 11 is structured by placing the cylinder head 13 upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned 1.75D (wherein "D" is a cylinder bore diameter) away from a mating surface between the cylinder head 13 and the cylinder 36. The impulse meter 38 measures torque which acts on the honeycomb rotor 37 by a swirl generated in the cylinder 36 due to the supply of the intake air (see the arrow in FIG. 11), and the intake flow lateral angular speed is obtained based on the torque.

Figure 12:
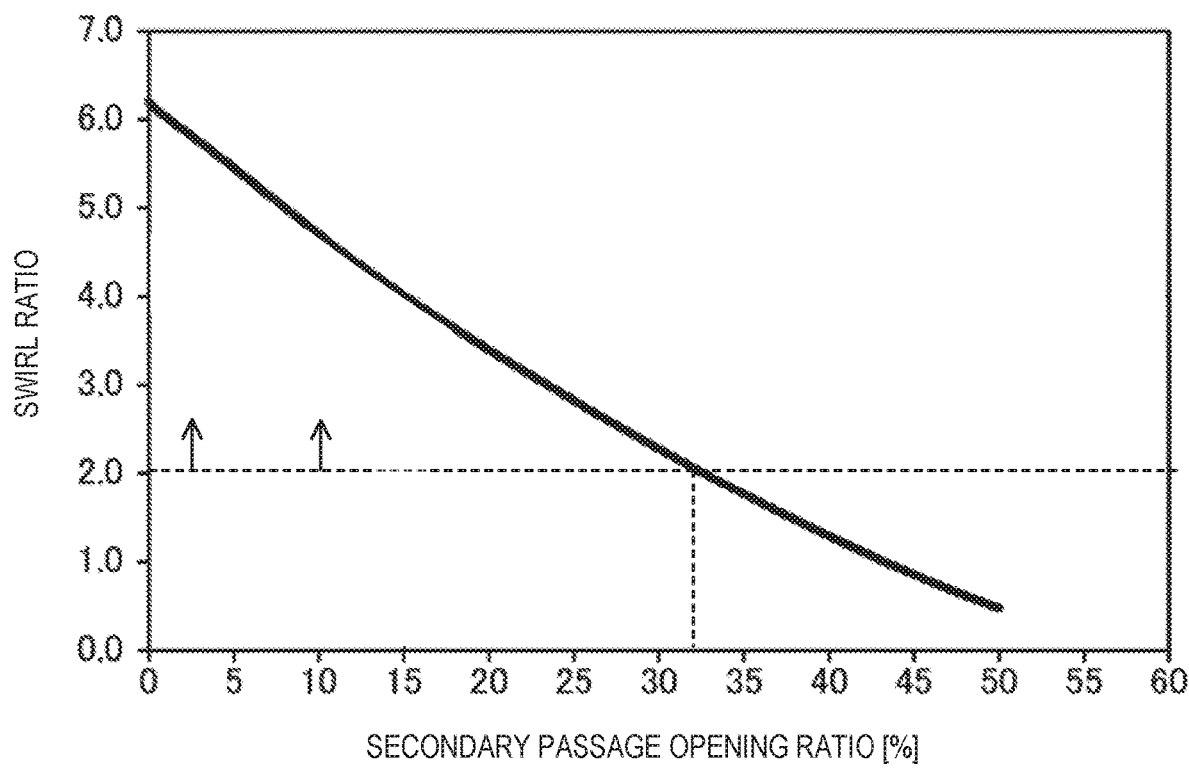
FIG. 12 is a chart illustrating a relationship between an opening ratio of a secondary passage and the swirl ratio.

FIG. 12 illustrates a relationship between the opening of the SCV 56 of the engine 1 and the swirl ratio. In FIG. 12, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened. As illustrated in FIG. 12, in the engine 1, the swirl ratio becomes around 6 when the SCV 56 is fully closed. When the engine 1 operates within the low load range (1)-1, the swirl ratio may be between 2 and 6. The opening of the SCV 56 may be adjusted within a range of the opening ratio of about 0% to 33%.

(Characteristic of Swirl Flow)

The swirl flow receives less influence by the engine speed than the tumble flow does. Thus, even when the engine speed changes, the fuel injection timing which enables the stable ignition does not change significantly. Therefore, by using the swirl flow, the mixture gas distribution is controlled independently of the engine speed.

Figure 13:
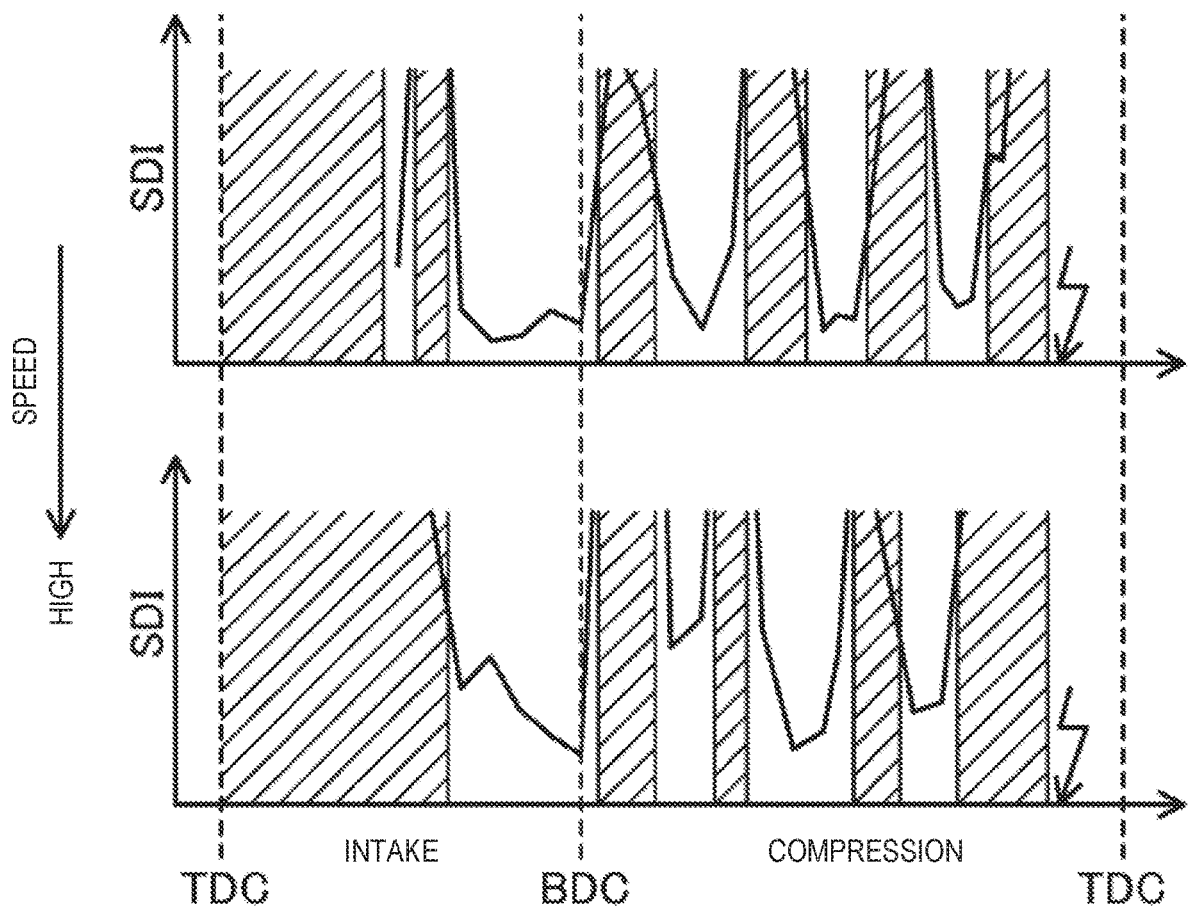
FIG. 13 shows charts illustrating a result of analyzing an influence of an engine speed on the ignition stability.

FIG. 13 shows charts illustrating a result of analyzing the influence of the engine speed on the ignition stability. The condition of this analysis is the same as in the analysis of the swirl flow intensity described above, except that the engine speed is different. The upper chart of FIG. 13 is the upper chart of FIG. 10. The lower chart of FIG. 13 indicates a case where the engine speed increased from that in the upper chart (engine speed difference: 1,000 rpm) under the same condition of the engine load.

As seen from FIG. 13, even when the engine speed changes, although the injection timing with which the stable ignition is possible slightly changes, many overlapping areas between the upper and lower charts can be confirmed. Therefore, the mixture gas distribution is controlled independently to the engine speed.

Therefore, by utilizing the swirl flow, the injected fuel portions are merged in the swirl flow or spread, and thus, the mixture gas distribution with different fuel concentrations depending on the position is formed. For example, since the mixture gas distribution formed by the fuel portions f8 to f10 spreads, a more homogeneous distribution in which the fuel concentration is relatively low and has less variation is formed. This is advantageous for the CI combustion. On the other hand, since the mixture gas distribution formed by the fuel portions f1 to f7 is concentrated, the uneven distribution with relatively high fuel concentration is formed. This is advantageous for the SI combustion.

By adjusting the position and timing at which the fuel reaches the swirl flow, the homogeneous mixture gas distribution in which the fuel is spread or the uneven mixture gas distribution in which the fuel concentration is high is formed. For example, by only injecting the fuel to spread, such as the fuel portions f8 to f10, the homogeneous mixture gas distribution is formed. By only injecting the fuel to be concentrated, such as the fuel portions f1 to f7, the concentrated mixture gas distribution with high fuel concentration is formed.

Further, the intensity of the swirl flow and the timing at which the swirl flow occurs may be adjusted. The position and direction of the fuel injection, and the number of times of fuel injections may be adjusted. In this manner, even with one fuel injection, mixture gas distributions in which the distribution of fuel concentration, its arrangement and form inside the combustion chamber 17 are different, are formable.

Further, a plurality of fuel injections are performed at different timings in one combustion cycle, a plurality of such mixture gas distributions are formed inside the combustion chamber 17, and these mixture gas distributions are unified by overlapping them at a given timing, such as the ignition timing. Thus, various forms of mixture gas distribution are accurately controlled.

(Search of Injection Timing for Low $NO_x$ and Low Fuel Amount)

Figure 14:
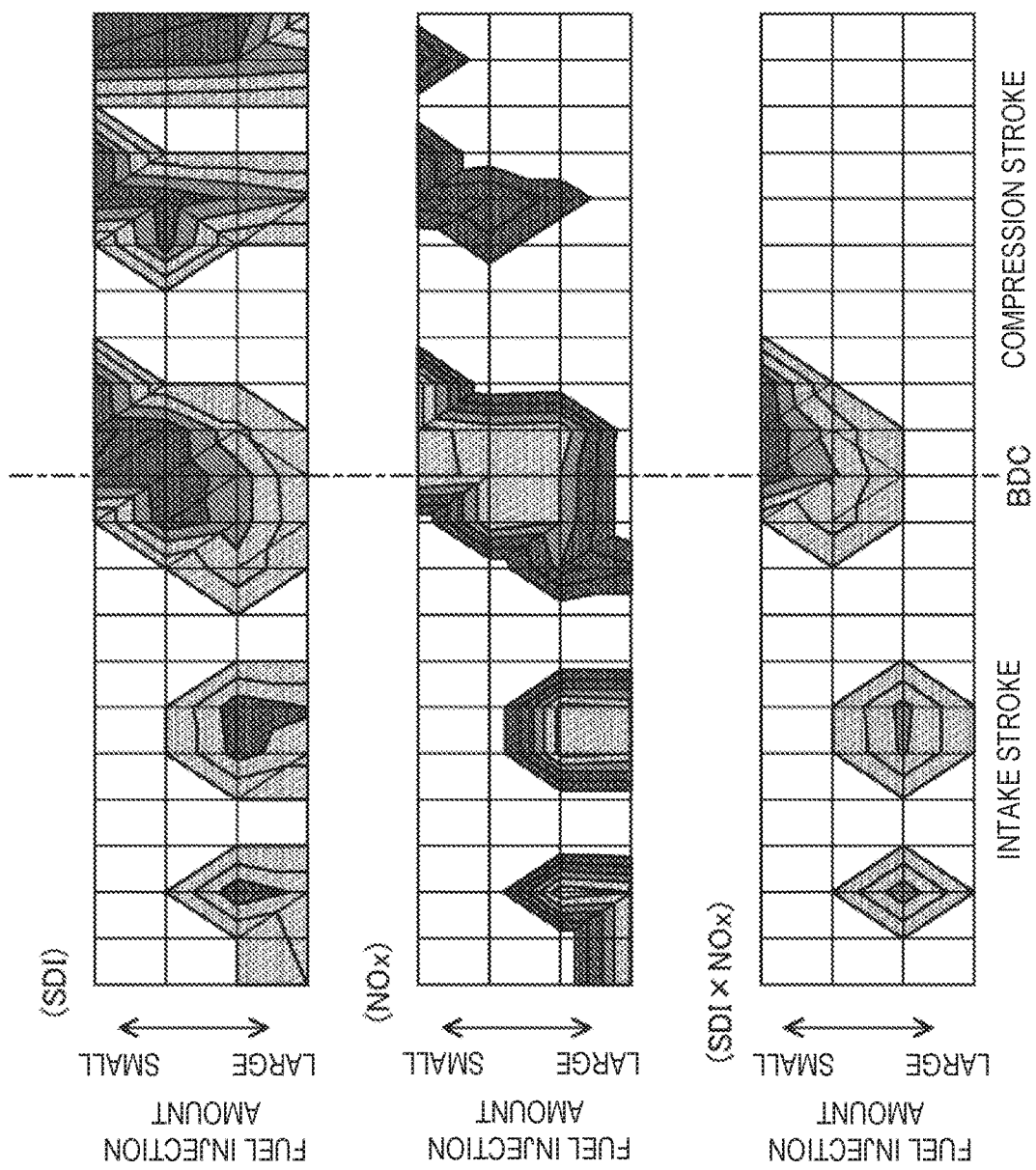
FIG. 14 shows diagrams illustrating one example of analysis performed when searching for an injection timing.

An analysis was conducted by controlling the mixture gas distribution using the swirl flow, to search for an injection timing with which the stable combustion is achievable with low $NO_x$ and by the fuel injection with a low fuel amount. FIG. 14 illustrates one example of this analysis. In this analysis, the engine speed is set to 2,000 rpm and a lump injection is performed so that A/F becomes 30:1. Note that the swirl ratio is 4 or above.

The upper part of FIG. 14 is a contour diagram showing combustion stability (SDI) with respect to the fuel injection amount (vertical axis) and the fuel injection timing (horizontal axis). The concentration is illustrated to be higher for ranges in which the combustion stability is higher. The middle part of FIG. 14 is a contour diagram showing the generation amount of $NO_x$ with respect to the fuel injection amount (vertical axis) and the fuel injection timing (horizontal axis). The concentration is illustrated to be higher for ranges in which the generation amount of $NO_x$ is larger.

The lower part of FIG. 14 is a contour diagram showing a range obtained by combining these contour diagrams, in which stable combustion is achievable with low $NO_x$ and by a given fuel injection with a low fuel amount. The concentration is illustrated to be higher as the combustion stability is higher for ranges in which the generation amount of $NO_x$ is smaller. For example, in this case, by injecting the fuel at a timing near the bottom dead center of the intake stroke, the stable combustion is performed with a small amount of fuel while reducing the $NO_x$ generation.

In this manner, by searching for the injection timing with which the stable combustion is achievable with low $NO_x$ and by the fuel injection with the low fuel amount under various conditions, an appropriate fuel injection timing according to the operating state of the engine 1 is selected.

(Engine Operation within Low Load Range (1)-1)

Figure 6:
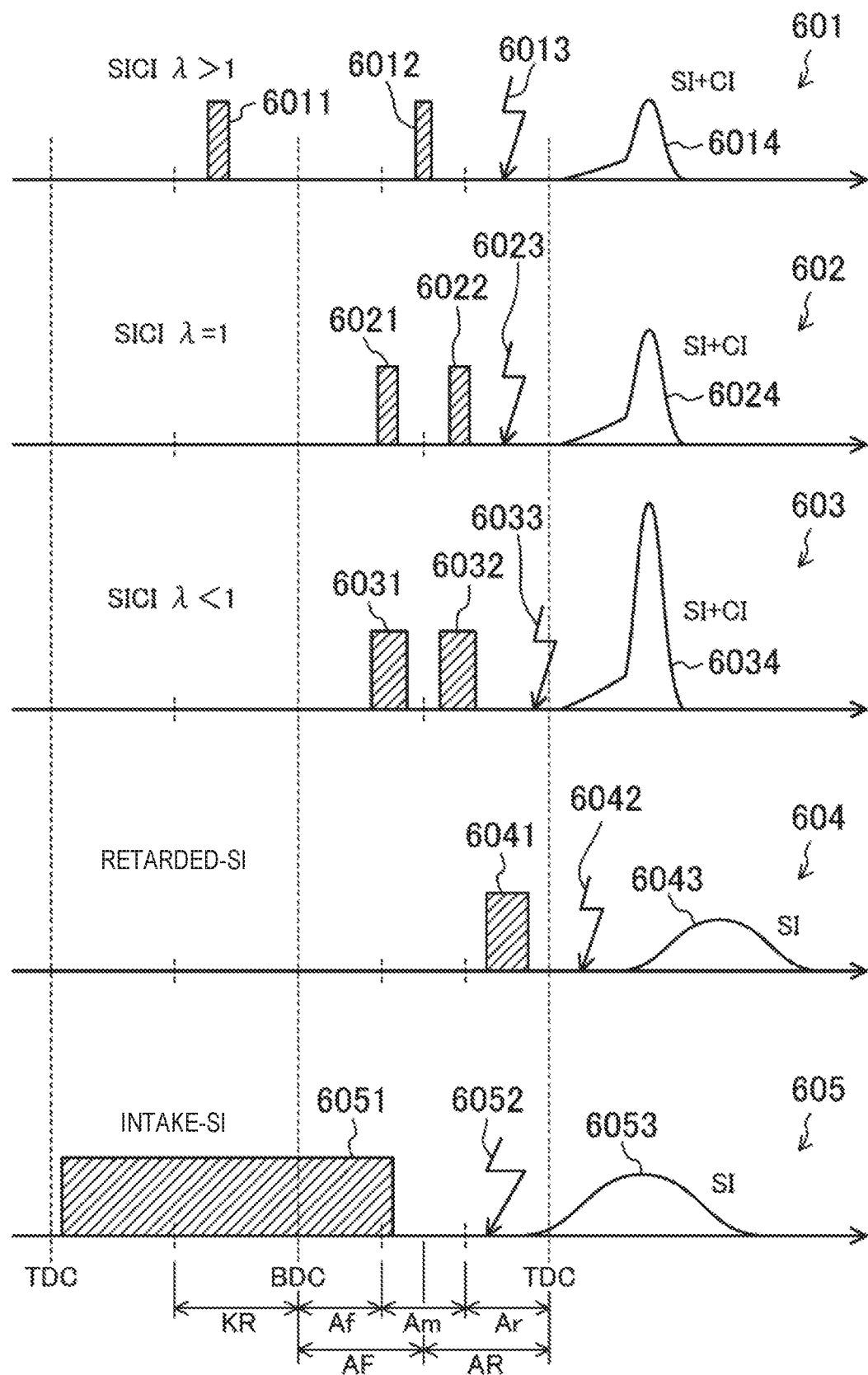
FIG. 6 shows charts illustrating a fuel injection timing, an ignition timing, and a combustion waveform in each operating range.

A reference character 601 in FIG. 6 indicates one example of fuel injection timings (reference characters 6011 and 6012) and an ignition timing (a reference character 6013), and a combustion waveform (i.e., a waveform indicating a change in heat generation rate with respect to the crank angle; a reference character 6014) when the engine 1 is operating in the operating state of the reference character 601 within the low load range (1)-1. For example, the fuel injection timing within a low (medium) load segment described later is illustrated. The operating range corresponding to the operating state 601 is indicated by a black circle 601 in FIG. 5A.

In the SPCCI combustion, the spark plug 25 forcibly ignites the mixture gas inside the combustion chamber 17 so that it is subjected to the SI combustion through flame propagation, and the heat generated by the SI combustion raises the temperature inside the combustion chamber 17 and the pressure inside the combustion chamber 17 rises by flame propagation, which leads to the CI combustion of unburned mixture gas by self-ignition.

It is possible to reduce the variation of the temperature inside the combustion chamber 17 before the compression starts by adjusting the heat generation amount in the SI combustion. Therefore, even when the temperature inside the combustion chamber 17 varies before the compression starts, for example, by controlling the ignition timing to adjust the start timing of the SI combustion, the timing of self-ignition is controlled.

In the case of performing the SPCCI combustion, the spark plug 25 ignites the mixture gas near CTDC, specifically at a given timing before CTDC, and thus, the combustion through flame propagation starts. The heat generation in the SI combustion is slower than the heat generation in the CI combustion. Therefore, the waveform of the heat generation rate has a relatively gentle slope. Although not illustrated, a pressure variation ($dp/d\theta$) in the combustion chamber 17 is gentler in the SI combustion than in the CI combustion.

When the temperature and pressure inside the combustion chamber 17 rise due to the SI combustion, the unburned mixture gas self-ignites. In the example of FIG. 6, the slope of the waveform of the heat generation rate changes from gentle to sharp at the self-ignition timing, i.e., the waveform of the heat generation rate has a flexion point at a timing when the CI combustion starts. In other words, the heat generation rate waveform of the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order.

After the CI combustion starts, the SI combustion and the CI combustion are performed in parallel. In the CI combustion, since the heat generation is larger than in the SI combustion, the heat generation rate becomes relatively high. Note that since the CI combustion is performed after CTDC, the piston 3 descends by motoring. Therefore, the slope of the waveform of the heat generation rate by the CI combustion is avoided from becoming excessively sharp. $dp/d\theta$ in the CI combustion also becomes relatively gentle.

$dp/d\theta$ is usable as an index expressing the combustion noise. Since the SPCCI combustion is able to lower $dp/d\theta$ as described above, it becomes possible to avoid the combustion noise from becoming excessively loud. Thus, the combustion noise is reduced below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving the fuel efficiency of the engine 1 than the SI combustion.

Further, in the SPCCI combustion, a combustion controller (e.g., EGR, S-VT, intake air amount controller) is controlled to change the heat generation amount of the SI combustion (the first heat generation rate portion) according to the operating state of the engine, so that the start timing of the CI combustion (the second heat generation rate portion) reaches a target CI combustion start timing set according to the operating state of the engine.

In order to improve the fuel efficiency of the engine 1, the EGR system 55 introduces the EGR gas into the combustion chamber 17 when the engine 1 is operating within the low load range (1)-1.

When the engine 1 operates within the low load range (1)-1, the ECU 10 controls the injector 6 to inject the fuel at a pressure between 30 MPa and 120 MPa as described above. Thus, among the fuel portions injected from the nozzle ports, the sprays of the fuel portions flowing toward the swirl flow reach the swirl flow and are suitably placed on the swirl flow.

As illustrated in FIG. 8, the sprays of the fuel portions f1 to f10 simultaneously injected from the nozzle ports of the injector 6 reach the swirl flow and form the mixture gas distribution while merging to concentrate or spreading. This mixture gas distribution moves within the combustion chamber 17 along the swirl flow.

When the engine 1 operates within the low load range (1)-1, the air-fuel ratio (A/F) of the mixture gas is leaner than the stoichiometric air-fuel ratio in the entire combustion chamber 17. That is, an excess air ratio λ of the mixture gas exceeds 1 in the combustion chamber 17 as a whole. More specifically, A/F of the mixture gas in the combustion chamber 17 as a whole is between 30:1 and 40:1. In this manner, generation of raw $NO_x$ is reduced and the exhaust gas performance is improved.

At the ignition timing of the spark plug 25, the mixture gas is stratified and the mixture gas distribution suitable for the SPCCI combustion is formed between the center portion and the outer circumferential portion of the combustion chamber 17. The center portion of the combustion chamber 17 is the portion where the spark plug 25 is disposed, and the outer circumferential portion is the portion around the center portion and in contact with a liner of the cylinder 11.

The center portion and the outer circumferential portion of the combustion chamber 17 may be inner and outer sections when the inner diameter of the combustion chamber 17 is evenly divided into two sections. The center portion and the outer circumferential portion of the combustion chamber 17 may alternatively be two sections on the internal side and one section on the outer side when the inner diameter of the combustion chamber 17 is evenly divided into three sections.

The fuel concentration distributed in the center portion of the combustion chamber 17 is higher than the fuel concentration distributed in the outer circumferential portion of the combustion chamber 17. For example, A/F of the mixture gas in the center portion is between 20:1 and 35:1, and A/F of the mixture gas in the outer circumferential portion is between 35:1 and 50:1. Note that A/F is the air-fuel ratio at the ignition timing, and the same applies for the description below.

The low load range (1)-1 is divided into three segments of the low (high) load segment, the low (medium) load segment, and the low (low) load segment in terms of the engine load. The low (high) load segment is a higher load segment in the low load range (1)-1 and continuous to the medium load range (1)-2. The low (medium) load segment is a lower load segment than the low (high) load segment, and the low (low) load segment is a lower load segment than the low (medium) load segment. The (low) load segment includes the idle operation.

The low (high) load segment, the low (medium) load segment, and the low (low) load segment may be, for example, segments obtained by evenly dividing the low load range (1)-1 into three segments in the load direction, and may suitably be set according to the specifications of the engine 1.

Figure 15:
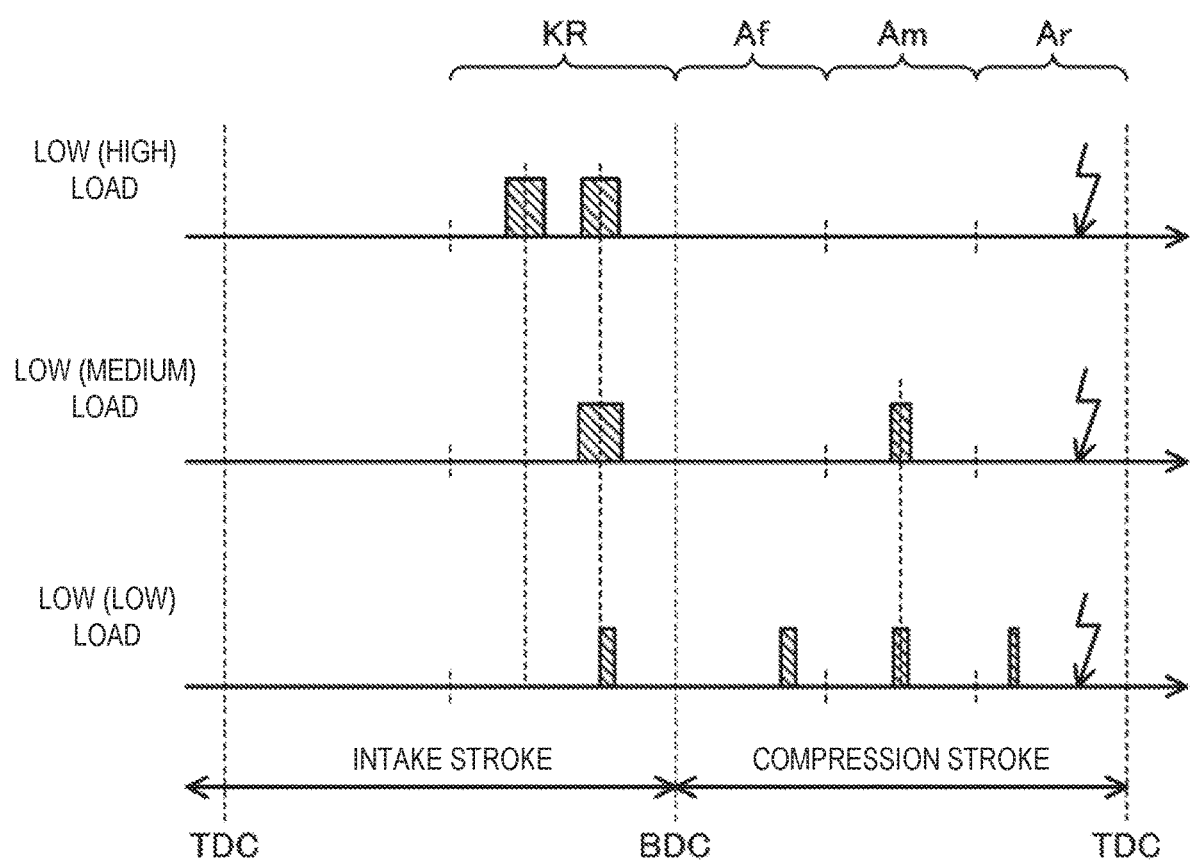
FIG. 15 shows charts illustrating an injection timing and a number of times of fuel injections in each of a low (high) load segment, a low (medium) load segment, and a low (low) load segment.

When the engine 1 operates within the low load range (1)-1, the fuel is injected at a given timing between the intake stroke and the compression stroke. The injection timings and the number of times of fuel injections are changed for the respective low (high) load segment, the low (medium) load segment, and the low (low) load segment. FIG. 15 shows the injection timings and the number of times of fuel injections in the respective segments. Note that the injection timings in these segments are set based on the search result of the injection timing described above.

When the engine 1 operates within the low (high) load segment, the fuel is dividedly injected in two injections in a latter half of the intake stroke (a latter half section of the intake stroke when evenly divided into two sections, indicated by a reference character KR in FIG. 15). The fuel injection amount within the low (high) load segment is relatively large within the low load range (1)-1. The fuel is divided into two portions substantially evenly (5:5) and injected in two injections.

Figure 16A:
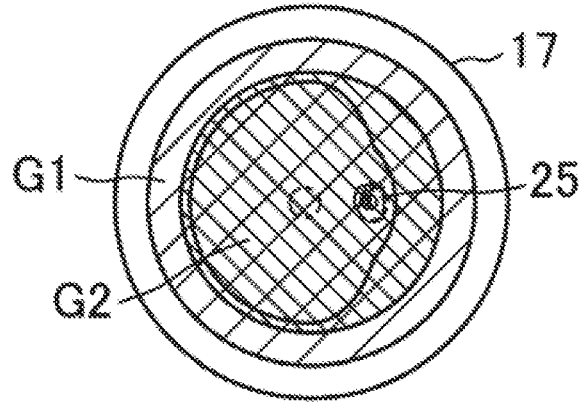
FIGS. 16A to 16C are conceptual diagrams illustrating the mixture gas distribution in each segment of the low load range.

These fuel portions injected during the intake stroke travel circumferentially by the swirl flow for a relatively long period. Thus, the mixture gas deflects to the center portion of the combustion chamber 17 while diffusing, and at the ignition timing immediately before CTDC, the mixture gas distribution widely spread in the combustion chamber 17 is formed. FIG. 16A schematically illustrates this mixture gas distribution when seen from the top of the combustion chamber 17.

A mixture gas distribution G1 formed by the fuel injected first and a mixture gas distribution G2 formed by the fuel injected later are conceptually illustrated. Since all the fuel injections have a long period of time until the ignition timing, the mixture gas distributions G1 and G2 of the fuel portions, formed by these injections, move by receiving the influence of the swirl flow and widely spread homogeneously. The mixture gas distribution G1 of the fuel injected first spreads slightly wider than the mixture gas distribution G2 of the fuel injected later. Centers of gravity of both the mixture gas distributions are located in the center portion of the combustion chamber 17.

These mixture gas distributions G1 and G2 overlap each other to form a unified mixture gas distribution. A/F of the mixture gas distribution in the center portion is controlled to between 20:1 and 35:1, and A/F in the outer circumferential portion is controlled to 35:1 or above. Note that when the engine 1 operates within the low (high) load segment, the fuel may be injected in a lump in the latter half of the intake stroke.

The spark plug 25 ignites the mixture gas in the center portion of the combustion chamber 17 at the ignition timing immediately before CTDC. Since A/F of the mixture gas is 20:1 to 35:1, the SI combustion through flame propagation is stably performed while reducing the generation of $NO_x$. By stabilizing the SI combustion, the CI combustion starts at the suitable timing. The controllability of the CI combustion improves in the SPCCI combustion.

When the engine 1 operates within the low (medium) load segment and the low (low) load segment, a plurality of injections are performed, including a first-stage injection in which the fuel is injected at a timing from the intake stroke to an intermediate stage of the compression stroke, and a second-stage injection in which the fuel is injected at a timing after the intermediate stage of the compression stroke. The intermediate stage of the compression stroke is, for example, a middle period when the compression stroke is evenly divided into three stages of an early stage, the intermediate stage, and a final stage (the early stage, the intermediate stage, and the final stage in FIG. 15 are indicated by reference characters Af, Am, and Ar, respectively). Although there may also be a case where the first-stage injection and the second-stage injection are performed in the intermediate stage of the compression stroke, in this case, the first-stage injection is performed before the second-stage injection. The spark plug may perform the ignition at a given ignition timing so that the mixture gas starts the combustion by flame propagation and then the unburned mixture gas self-ignites, the given ignition timing being stored in a memory.

When the engine 1 operates within the low (medium) load segment, the first-stage injection is performed once in the latter half of the intake stroke, and the second-stage injection is performed once in the intermediate stage of the compression stroke. Within the low (medium) load segment, the fuel injection amount is smaller than that within the low (high) load segment. In the first-stage injection, a larger amount of fuel is injected compared to in the second-stage injection, e.g., at a ratio of the first-stage injection amount:the second-stage injection amount=7:3.

The mixture gas distribution of the fuel of the first-stage injection performed during the intake stroke deflects to the center portion of the combustion chamber 17 while diffusing, and at the ignition timing, the mixture gas distribution widely spread in the combustion chamber 17 is formed. On the other hand, the second-stage injection performed in the intermediate stage of the compression stroke has a short period of time until the ignition timing. Therefore, the mixture gas distribution of the fuel of the second-stage injection does not spread much, and at the ignition timing, its center of gravity is located around the spark plug 25 placed at the center portion of the combustion chamber 17. Thus, at the ignition timing, the mixture gas distribution in which the distribution of A/F varies relatively great between the center portion and the outer circumferential portion of the combustion chamber 17 is formed.

Figure 16B:
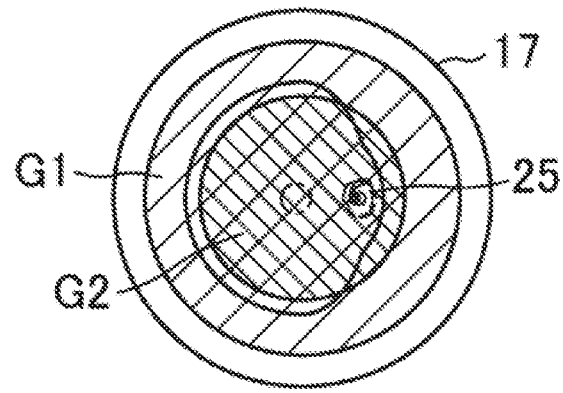

FIG. 16B schematically illustrates the mixture gas distribution. Similarly to FIG. 16A, it conceptually illustrates the mixture gas distribution G1 of the fuel of the first-stage injection performed first and the mixture gas distribution G2 of the fuel of the second-stage injection performed later. With the mixture gas distribution G1 of the fuel of the first-stage injection, while the fuel amount is relatively large, the fuel homogeneously and widely spreads. Therefore, its fuel concentration is low. With the mixture gas distribution G2 of the fuel of the second-stage injection, while the fuel amount is relatively small, the fuel concentrates and does not spread widely. Therefore, its fuel concentration is high. Further, centers of gravity of both the mixture gas distributions are located in the center portion of the combustion chamber 17.

Thus, even with a relatively small amount of fuel, A/F in the center portion of the mixture gas distribution is between 20:1 to 35:1. A/F of the outer circumferential portion is 35:1 or above. Therefore, similar to the low (high) load segment, the SI combustion through flame propagation is stably performed while reducing the generation of $NO_x$. By stabilizing the SI combustion, the CI combustion starts at the suitable timing. The controllability of the CI combustion improves in the SPCCI combustion.

When the engine 1 operates within the low (low) load segment, the first-stage injection is performed once in the latter half of the intake stroke, and the second-stage injection is dividedly performed in three injections (1st second-stage injection, 2nd second-stage injection, and 3rd second-stage injection) on the compression stroke. For example, the 1st second-stage injection is performed in a period from the early to intermediate stages of the compression stroke, the 2nd second-stage injection is performed in the intermediate stage of the compression stroke, and the 3rd second-stage injection is performed in a period from the intermediate to final stages of the compression stroke. That is, the ECU 10 controls the injector 6 to increase the number of times of fuel injections in the second-stage injection.

Within the low (low) load segment, the fuel injection amount is smaller than that within the low (medium) load segment. The ratio of the fuel injection amount is, for example, the first-stage injection: the 1st second-stage injection: the 2nd second-stage injection: the 3rd second-stage injection=1:1:1:0.5, and may be set according to the specifications.

The 2nd second-ignition injection is performed in the intermediate stage of the same compression stroke as the second-stage injection in the low (medium) load segment, the 1st second-ignition injection is performed earlier than the 2nd second-ignition injection, and the 3rd second-ignition injection is performed at an even later timing. Thus, the mixture gas distribution of the 1st second-stage injection diffuses larger than the mixture gas distribution of the 2nd second-stage injection, and the mixture gas distribution of the 3rd second-stage injection diffuses less than the mixture gas distribution of the 2nd second-stage injection, and is concentrated. At the ignition timing, the centers of gravity of these mixture gas distributions are set to be located around the spark plug 25 in the center portion of the combustion chamber 17. Thus, at the ignition timing, the mixture gas distribution in which the distribution of A/F varies greatly between the center portion and the outer circumferential portion of the combustion chamber 17 is formed.

Figure 16C:
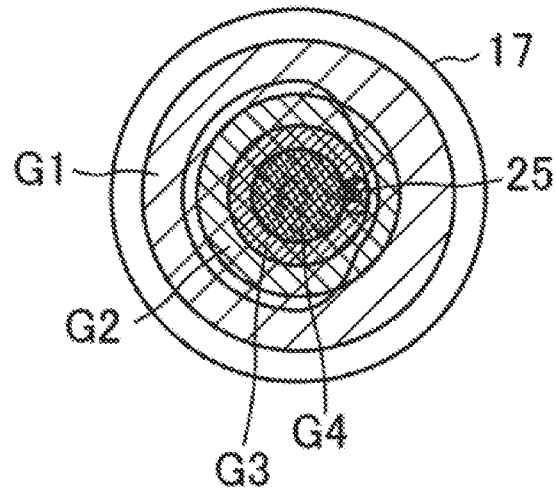

FIG. 16C schematically illustrates this mixture gas distribution. The mixture gas distribution G1 of the fuel of the first-stage injection, and mixture gas distributions G2, G3 and G4 of the respective fuel portions of the 1st to 3rd second-stage injections are conceptually illustrated. The mixture gas distributions G1 to G4 of the fuel portions of the first-stage injection, and the 1st to 3rd second-stage injections overlap and, thus, the mixture gas distribution in which the distribution of A/F is significantly uneven is formed.

Thus, even with a small amount of fuel, A/F in the center portion of the mixture gas distribution is between 20:1 to 35:1. A/F of the outer circumferential portion is 35:1 or above. Therefore, similar to the low (high) load segment and the low (medium) load segment, the SI combustion through flame propagation is stably performed while reducing the generation of $NO_x$. By stabilizing the SI combustion, the CI combustion starts at the suitable timing. The controllability of the CI combustion improves in the SPCCI combustion.

As a result, when the engine 1 operates within the low load range (1)-1, the ignitability of the SI combustion is improved and the SI combustion is stabilized. Further, the stable SPCCI combustion is performed and combustion with low NO and high fuel efficiency is achieved.

When the engine 1 operates within the low (low) load segment, the injection timing of the second-stage injection may be delayed (retarded) instead of increasing the number of times of injections in the second-stage injection.

Figure 17:
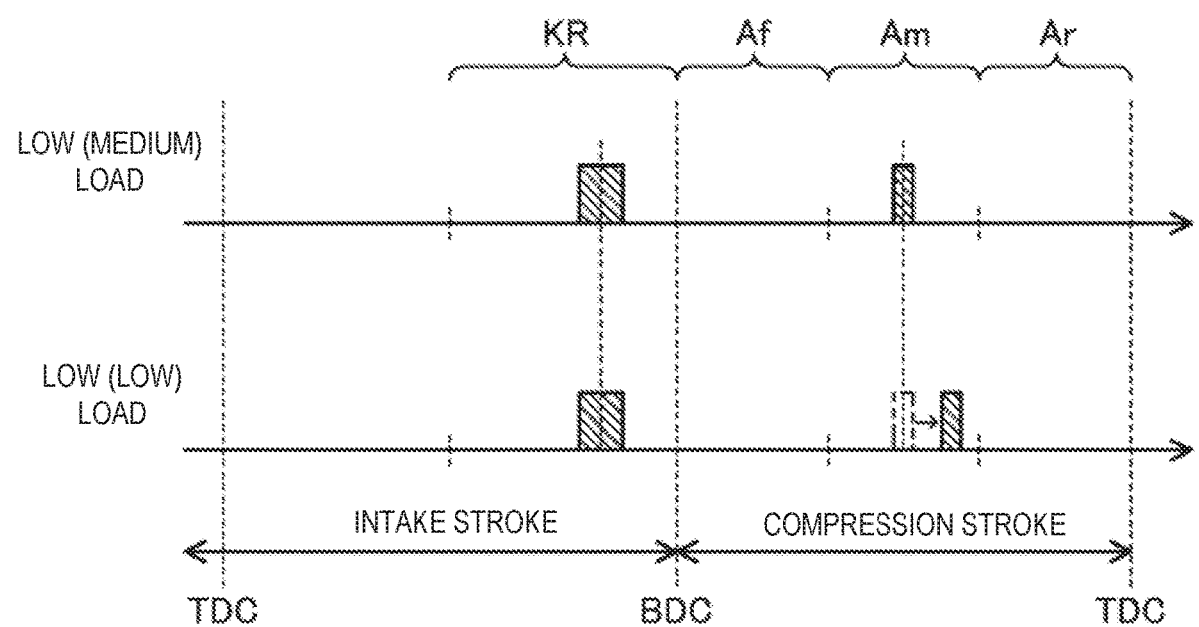
FIG. 17 shows charts illustrating a modification of the control within the low (low) load segment.

For example, as illustrated in FIG. 17, within the low (low) load segment, the ECU 10 controls the injector 6 so that the injection timing of the second-stage injection is later than the low (medium) load segment. The amount of fuel injected in the second-stage injection may be the same for the both segments. In this manner, within the second-stage injection within the low (low) load segment, since the period from the injection to the ignition timing is short, the mixture gas distribution spreads smaller than in the second-stage injection within the low (medium) load segment. By retarding the injection timing of the second-stage injection, the mixture gas distribution with high fuel concentration (A/F is small) is formed.

By overlapping these mixture gas distributions, the mixture gas distribution including the outer circumferential portion in which the fuel concentration is low (A/F is 35:1 or above) and the center portion in which the fuel concentration is higher (A/F is 20:1 to 35:1) is formed at the ignition timing. Therefore, also in this case, the SI combustion through flame propagation is stably performed while reducing the generation of $NO_x$. By stabilizing the SI combustion, the CI combustion starts at the suitable timing. The controllability of the CI combustion improves in the SPCCI combustion.

Note that when the engine load is the same, the injection timing may be kept even when the engine speed changes.

As described above, the swirl flow receives little influence of the engine speed. Therefore, when the engine load is the same, i.e., when the fuel injection amount is the same, even if the engine speed changes, by injecting the fuel at the same timing, a similar mixture gas distribution is formed within the combustion chamber at the injection timing. Thus, when the engine load is the same, by the ECU 10 outputting a control signal to the injector 6 to keep the injection timing regardless of the changing engine speed, stable combustion is achieved while simplifying the control.

Since the engine 1 performs the SPCCI combustion by making the mixture gas leaner than the stoichiometric air-fuel ratio within the low load range (1)-1, the low load range (1)-1 may be referred to as "SPCCI lean range."

(Medium Load Range (1)-2)

Also when the engine 1 is operating within the medium load range (1)-2, the engine 1 performs the SPCCI combustion similarly to the low load range (1)-1.

The reference character 602 in FIG. 6 indicates one example of the fuel injection timings (reference characters 6021 and 6022) and the ignition timing (a reference character 6023), and the combustion waveform (a reference character 6024) when the engine 1 is operating in the operating state of the reference character 602 within the medium load range (1)-2 of the engine 1. The operating range corresponding to the operating state 602 is indicated by a black circle 602 in FIG. 5A.

The EGR system 55 introduces the EGR gas into the combustion chamber 17 when the operating state of the engine 1 is within the medium load range (1)-2.

Also when the engine 1 operates within the medium load range (1)-2, similar to the low load range (1)-1, a strong swirl flow at a swirl ratio of at least 2, preferably 4 or above, is formed in the combustion chamber 17. The SCV 56 is fully closed or has a given narrow opening. Since turbulence kinetic energy in the combustion chamber 17 increases by enhancing the swirl flow, when the engine 1 operates within the medium load range (1)-2, the flame of the SI combustion propagates promptly and the SI combustion is stabilized. The controllability of the CI combustion improves by stabilizing the SI combustion. By making the timing of the CI combustion in the SPCCI combustion appropriate, the generation of combustion noise is reduced and the fuel efficiency is improved. Further, the variation in torque between cycles is reduced.

When the engine 1 operates within the medium load range (1)-2, the air-fuel ratio (A/F) of the mixture gas is at the stoichiometric air-fuel ratio (A/F=14.7:1) in the entire combustion chamber 17. The three-way catalyst purifies the exhaust gas discharged from the combustion chamber 17. Thus, the exhaust gas performance of the engine 1 becomes good. A/F of the mixture gas may be set to remain within a purification window of the three-way catalyst (i.e., an air-fuel ratio width exhibiting the three-way purification function). Therefore, the excess air ratio λ of the mixture gas may be 1.0±0.2.

When the engine 1 operates within the medium load range (1)-2, the injector 6 injects the fuel into the combustion chamber 17 in two stages, the first-stage injection (a reference character 6021) and the second-stage injection (a reference character 6022). In the first-stage injection, the fuel is injected at the timing separated from the ignition timing, and in the second-stage injection, the fuel is injected at the timing close to the ignition timing. The first-stage injection may be performed, for example, in the early half of the compression stroke, and the second-stage injection may be performed, for example, in the latter half of the compression stroke. The early half and latter half of the compression stroke may be defined by evenly dividing the compression stroke into two in terms of the crank angle (the early half and latter half of the compression stroke are indicated by reference characters AF and AR, respectively, in FIG. 6).

The injector 6 injects the fuel radially outwardly from the plurality of inclined nozzle ports so as to spread from the center portion of the combustion chamber 17. When the injector 6 performs the first-stage injection in the period of the early half of the compression stroke, since the piston 3 is separated from TDC, the injected fuel spray reaches the upper surface of the piston 3 elevating toward TDC, outside the cavity 31. A section outside the cavity 31 forms a squish area 171 (see FIG. 2). The fuel injected in the first-stage injection remains in the squish area 171 while the piston 3 elevates and forms the mixture gas in the squish area 171.

When the injector 6 performs the second-stage injection in the period of the latter half of the compression stroke, since the piston 3 is close to TDC, the injected fuel spray enters the cavity 31. The fuel injected in the second-stage injection forms the mixture gas in the section within the cavity 31. Here, the phrase "the section within the cavity 31" may mean a combination of a section from a projection plane of the opening surface of the cavity 31 on the ceiling surface of the combustion chamber 17 to the opening surface of the cavity 31 and a section inside the cavity 31. The phrase "the section within the cavity 31" may also be said to be a section of the combustion chamber 17 outside the squish area 171.

Due to injecting the fuel into the cavity 31 by the second-stage injection, the flow of gas occurs in the section within the cavity 31. When the time to the ignition timing is long, the turbulence kinetic energy inside the combustion chamber 17 attenuates as the compression stroke progresses. However, since the injection timing of the second-stage injection is close to the ignition timing compared to that of the first-stage injection, the spark plug 25 ignites the mixture gas in the section within the cavity 31 while keeping the high turbulence kinetic energy therewithin. Thus, the speed of the SI combustion increases. When the speed of the SI combustion increases, as described above, the controllability of the CI combustion by the SI combustion improves.

By the injector 6 performing the first-stage injection and the second-stage injection, in the combustion chamber 17, substantially homogeneous mixture gas in which the excess air ratio λ is 1.0±0.2 is formed as a whole. Since the mixture gas is substantially homogeneous, the improvement in the fuel efficiency by reducing the unburned fuel loss and the improvement in the exhaust gas performance by avoiding the smoke generation are achieved. The excess air ratio λ is preferably 1.0 to 1.2.

By the spark plug 25 igniting the mixture gas at the given timing before CTDC (a reference character 6023), the mixture gas combusts by flame propagation. After this combustion starts, the unburned mixture gas self-ignites and causes the CI combustion. The fuel injected in the second-stage injection mainly causes the SI combustion. The fuel injected in the first-stage injection mainly causes the CI combustion. By performing the first-stage injection on the compression stroke, the fuel injected in the first-stage injection is prevented from causing the abnormal combustion, such as the pre-ignition. Moreover, the fuel injected in the second-stage injection is stably combusted by flame propagation.

Within the medium load range (1)-2, since the engine 1 performs the SPCCI combustion by setting the mixture gas to the stoichiometric air-fuel ratio, the medium load range (1)-2 may be referred to as "SPCCIλ=1 range."

Here, as illustrated in FIG. 5A, the booster 44 is turned off (see "S/C OFF") within part of the low load range (1)-1 and part of the medium load range (1)-2. In detail, the booster 44 is turned off within a low speed segment of the low load range (1)-1. Within a high speed segment of the low load range (1)-1, the booster 44 is turned on to increase the boosting pressure in order to secure a required intake charge amount corresponding to the engine speed being high. Further, within a low-load low-speed segment of the medium load range (1)-2, the booster 44 is turned off. Within a high load segment of the medium load range (1)-2, the booster 44 is turned on in order to secure the required intake charge amount corresponding to the fuel injection amount increasing. Within the high speed segment, the booster 44 is turned on in order to secure the required intake charge amount corresponding to the engine speed being high.

Note that within the high-load medium-speed range (2), the high-load low-speed range (3), and the high speed range (4), the booster 44 is turned on throughout the ranges (see "S/C ON").

(High-Load Medium-Speed Range (2))

Also when the engine 1 is operating within the high-load medium-speed range (2), the engine 1 performs the SPCCI combustion similarly to the low load range (1)-1 and the medium load range (1)-2.

A reference character 603 in FIG. 6 indicates one example of the fuel injection timings (reference characters 6031 and 6032) and the ignition timing (a reference character 6033), and the combustion waveform (a reference character 6034) when the engine 1 is operating in the operating state of the reference character 603 within the high-load medium-speed range (2) of the engine 1. The operating range corresponding to the operating state 603 is indicated by a black circle 603 in FIG. 5A

The EGR system 55 introduces the EGR gas into the combustion chamber 17 when the operating state of the engine 1 is within the high-load medium-speed range (2). The engine 1 reduces the EGR gas amount as the engine load increases. At the full load, the EGR gas may be set to zero.

Also when the engine 1 operates within the high-load medium-speed range (2), similar to the low load range (1)-1, a strong swirl flow at a swirl ratio of at least 2, preferably 4 or above, is formed in the combustion chamber 17. The SCV 56 is fully closed or has a given opening.

When the engine 1 operates within the high-load medium-speed range (2), the air-fuel ratio (A/F) of the mixture gas is at or richer than the stoichiometric air-fuel ratio in the entire combustion chamber 17 (i.e., the excess air ratio $\lambda$ of the mixture gas is $\lambda \leq 1$).

When the engine 1 operates in the operating state 603 within the high-load medium-speed range (2), the injector 6 injects the fuel into the combustion chamber 17 in two stages, the first-stage injection (the reference character 6031) and the second-stage injection (the reference character 6032) on the compression stroke. The first-stage injection may be performed, for example, in the early half of the compression stroke indicated by the reference character AF, and the second-stage injection may be performed, for example, in the latter half of the compression stroke indicated by the reference character AR.

When a strong swirl flow is generated in the combustion chamber 17, the fuel of the first-stage injection forms the mixture gas in the center portion of the combustion chamber 17. This mixture gas in the center portion is combusted mainly in the SI combustion. The fuel of the second-stage injection mainly forms the mixture gas in the outer circumferential portion of the combustion chamber 17. This mixture gas in the outer circumferential portion is combusted mainly in the CI combustion.

Further, in the fuel injection including the first-stage injection and the second-stage injection, the fuel concentration of the mixture gas in the outer circumferential portion of the combustion chamber is brought higher than the fuel concentration of the mixture gas in the center portion, and the fuel amount of the mixture gas in the outer circumferential portion is brought larger than that in the center portion. The injection amount of the first-stage injection may be set larger than that of the second-stage injection. The ratio between the injection amount of the first-stage injection and the injection amount of the second-stage injection may be, for example, 7:3.

When the engine 1 operates within the high-load medium-speed range (2), the excess air ratio $\lambda$ of the mixture gas in the center portion where the spark plug 25 is disposed is preferably 1 or less, and the excess air ratio $\lambda$ of the mixture gas in the outer circumferential portion is 1 or less, preferably below 1. The air-fuel ratio (A/F) of the mixture gas in the center portion may be, for example, between 13 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. The air-fuel ratio of the mixture gas in the entire combustion chamber 17 may be between 12.5:1 and 13:1. Since the amount of fuel within the mixture gas increases in the outer circumferential portion when the excess air ratio $\lambda$ of the outer circumferential portion of the combustion chamber 17 is set to below 1, the temperature is lowered by the latent heat of vaporization of the fuel. The air-fuel ratio of the mixture gas in the entire combustion chamber 17 may be between 12.5:1 and the stoichiometric air-fuel ratio, preferably between 12.5:1 and 13:1.

Since the spark plug 25 is disposed in the center portion of the combustion chamber 17, the spark plug 25 ignites the mixture gas in the center portion of the combustion chamber 17 (the reference character 6033). By the ignition of the spark plug 25, the mixture gas in the center portion starts the SI combustion through flame propagation.

Within the high load range, the fuel injection amount increases as well as the temperature of the combustion chamber 17, therefore the CI combustion easily starts. In other words, within the high load range, the pre-ignition easily occurs. However, since the temperature of the outer circumferential portion of the combustion chamber 17 is lowered by the latent heat of vaporization of the fuel as described above, the CI combustion is avoided from starting immediately after the mixture gas is spark-ignited.

Since the engine 1 performs the SPCCI combustion by setting the mixture gas to or richer than the stoichiometric air-fuel ratio within the high-load medium-speed range (2), the high-load medium-speed range (2) may be referred to as "SPCCI$\lambda \leq 1$ range."

(High-Load Low-Speed Range (3))

When the engine speed is low, the time length for the crank angle to change 1° becomes longer. Within the high-load low-speed range (3), if the fuel is injected into the combustion chamber 17 in the intake stroke and the early half of the compression stroke similarly to within the high-load medium-speed range (2), the reaction of the fuel excessively progresses and causes pre-ignition. When the engine 1 is operating within the high-load low-speed range (3), it becomes difficult to perform the SPCCI combustion.

When the engine 1 is operating within the high-load low-speed range (3), the engine 1 performs the SI combustion instead of the SPCCI combustion.

A reference character 604 in FIG. 6 indicates one example of the fuel injection timing (a reference character 6041) and the ignition timing (a reference character 6042), and the combustion waveform (a reference character 6043) when the engine 1 is operating in the operating state of the reference character 604 within the high-load low-speed range (3) of the engine 1. The operating range corresponding to the operating state 604 is indicated by a black circle 604 in FIG. 5A.

The EGR system 55 introduces the EGR gas into the combustion chamber 17 when the operating state of the engine 1 is within the high-load low-speed range (3). The engine 1 reduces the EGR gas amount as the engine load increases. At the full load, the EGR gas may be set to zero.

When the engine 1 is operating within the high-load low-speed range (3), the air-fuel ratio (A/F) of the mixture gas is at the stoichiometric air-fuel ratio (A/F=14.7:1) in the entire combustion chamber 17. A/F of the mixture gas may be set to remain within the purification window of the three-way catalyst. Therefore, an excess air ratio λ of the mixture gas may be 1.0±0.2. By setting the air-fuel ratio of the mixture gas to the stoichiometric air-fuel ratio, the fuel efficiency improves within the high-load low-speed range (3). Note that when the engine 1 operates within the high-load low-speed range (3), the fuel concentration of the mixture gas in the entire combustion chamber 17 may be set so that the excess air ratio λ is 1 or less and equal to or higher than the excess air ratio λ within the high-load medium-speed range (2), preferably higher than the excess air ratio λ within the high-load medium-speed range (2).

When the engine 1 operates within the high-load low-speed range (3), the injector 6 injects the fuel into the combustion chamber 17 at a timing in the period from the final stage of the compression stroke to an early stage of the expansion stroke (hereinafter, referred to as "the retard period") (the reference character 6041). As described above, the final stage of the compression stroke may be the final stage when the compression stroke is evenly divided into three stages of the early stage, the intermediate stage, and the final stage. Similarly, the early stage of the expansion stroke may be the early stage when the expansion stroke is evenly divided into three stages of the early stage, an intermediate stage, and a final stage.

By setting the fuel injection timing to a late timing, pre-ignition is avoided. The fuel pressure is set to a high fuel pressure of 30 MPa or above. By increasing the fuel pressure, the fuel injection period and the mixture gas formation period are shortened. An upper limit of the fuel pressure may be, for example, 120 MPa.

After the fuel is injected, the spark plug 25 ignites the mixture gas at a timing near CTDC (the reference character 6042). The spark plug 25 ignites, for example, after CTDC. The mixture gas causes the SI combustion on the expansion stroke. Since the SI combustion starts on the expansion stroke, the CI combustion does not start.

In order to avoid the pre-ignition, the injector 6 retards the fuel injection timing as the engine speed decreases. The fuel injection may end on the expansion stroke.

Within the high-load low-speed range (3), since the engine 1 performs the SI combustion by injecting the fuel in the retard period from the final stage of the compression stroke to the early stage of the expansion stroke, the high-load low-speed range (3) may be referred to as "retarded SI range."

(High Speed Range (4))

When the engine speed is high, the time length for the crank angle to change 1° becomes shorter. Therefore, for example, within a high speed segment of the high load range, it is difficult to stratify the mixture gas in the combustion chamber 17 by performing the split injections during the compression stroke as described above. When the engine speed increases, it becomes difficult to perform the SPCCI combustion described above.

When the engine 1 is operating within the high speed range (4), the engine 1 performs the SI combustion instead of the SPCCI combustion. Note that the high speed range (4) extends over the entire load direction from low load to high loads.

A reference character 605 in FIG. 6 indicates one example of the fuel injection timing (a reference character 6051) and the ignition timing (a reference character 6052), and the combustion waveform (a reference character 6053) when the engine 1 is operating in the operating state of the reference character 605 within the high speed range (4) of the engine 1. The operating range corresponding to the operating state 605 is indicated by a black circle 605 in FIG. 5A.

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating within the high speed range (4), the engine 1 fully opens the SCV 56. No swirl flow is generated in the combustion chamber 17, and only the tumble flow is generated. By fully opening the SCV 56, a charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F=14.7:1) in the entire combustion chamber 17. The excess air ratio λ of the mixture gas may be set to 1.0±0.2. Note that within the high load segment of the high speed range (4) including the full load, the excess air ratio λ of the mixture gas may be below 1.

When the engine 1 operates within the high speed range (4), the injector 6 starts the fuel injection on the intake stroke (the reference character 6051). The injector 6 injects all the fuel portion for one combustion cycle in a lump. Note that in the operating state 605, since the engine load is high, the fuel injection amount is large. The fuel injection period changes according to the fuel injection amount. By starting the fuel injection on the intake stroke, homogeneous or substantially homogeneous mixture gas is formed in the combustion chamber 17. Further, when the engine speed is high, since the evaporation time of the fuel is secured as long as possible, the unburned fuel loss is reduced.

After the fuel injection is ended, the spark plug 25 ignites the mixture gas at a suitable timing before CTDC (the reference character 6052).

Therefore, within the high speed range (4), since the engine 1 starts the fuel injection on the intake stroke and performs the SI combustion, the high speed range (4) may be referred to as "intake SI range."

(Control Process of Engine)

Figure 18:
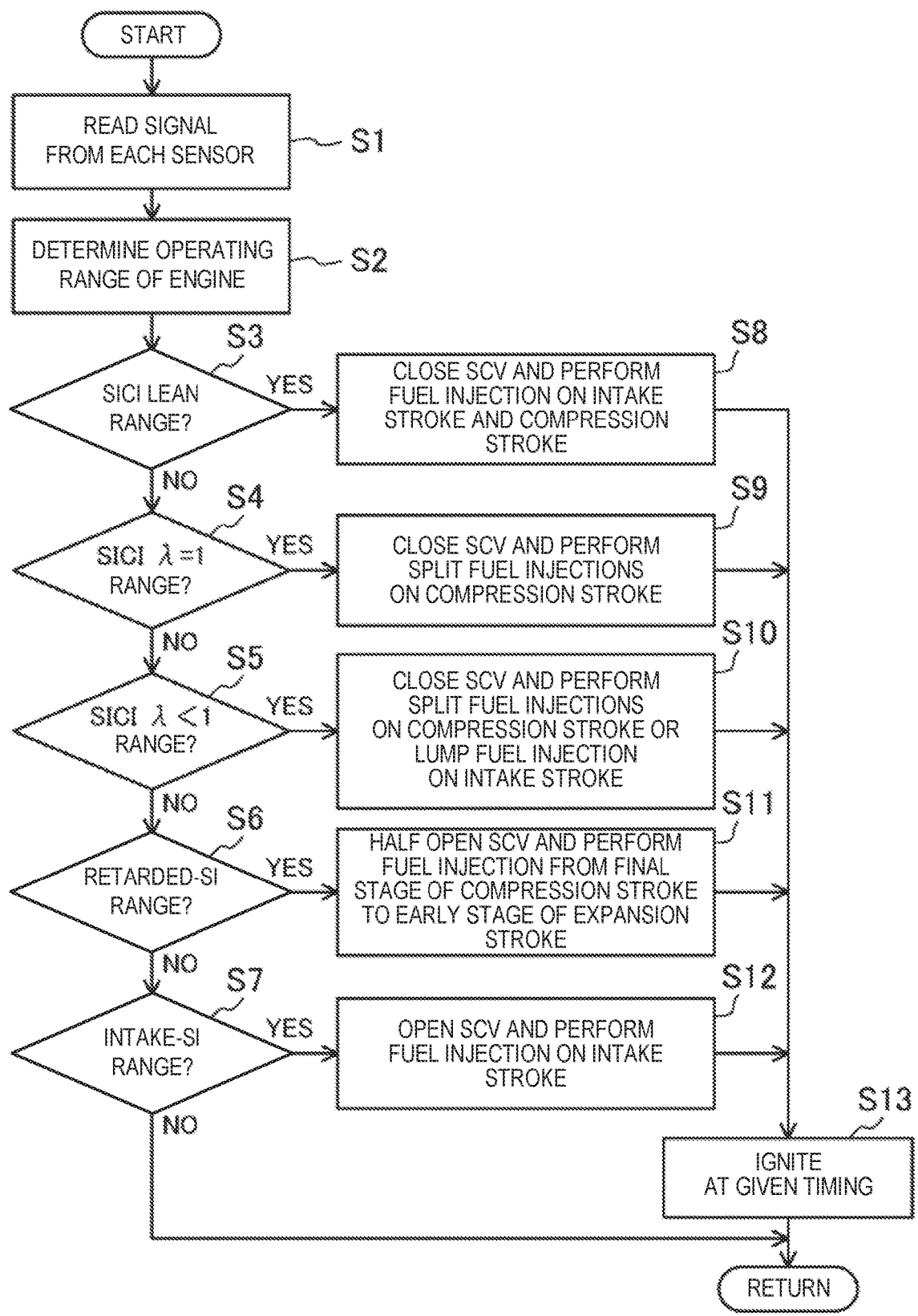
FIG. 18 is a flowchart illustrating a control process of the engine.

Next, an operation control of the engine 1 executed by the ECU 10 will be described with reference to the flowchart of FIG. 18. First at S1 after the start, the ECU 10 reads the signals from the sensors SW1 to SW16. Next at S2, the ECU 10 determines the operating range of the engine 1.

At S3, the ECU 10 determines whether the engine 1 operates within "SPCCI lean range" (i.e., low load range (1)-1). If the result is positive, the process proceeds to S8, whereas if the result is negative, the process proceeds to S4.

At S4, the ECU 10 determines whether the engine 1 operates within "SPCCIλ=1 range" (i.e., medium load range (1)-2). If the result is positive, the process proceeds to S9, whereas if the result is negative, the process proceeds to S5.

At S5, the ECU 10 determines whether the engine 1 operates within "SPCCIλ≤1 range" (i.e., high-load medium-speed range (2)). If the result is positive, the process proceeds to S10, whereas if the result is negative, the process proceeds to S6.

At S6, the ECU 10 determines whether the engine 1 operates within "retarded SI range" (i.e., high-load low-speed range (3)). If the result is positive, the process proceeds to S11, whereas if the result is negative, the process proceeds to S7.

At S7, the ECU 10 determines whether the engine 1 operates within "intake SI range" (i.e., high speed range (4)). If the result is positive, the process proceeds to S12, whereas if the result is negative, the process returns to S1.

At S8, the ECU 10 outputs a control signal to the SCV 56 to close. Further, the ECU 10 outputs a control signal to the injector 6 to perform the first-stage injection on the intake stroke and perform the second-stage injection on the compression stroke. Thus, stratified mixture gas is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S9, the ECU 10 outputs a control signal to the SCV 56 to close. Further, the ECU 10 outputs a control signal to the injector 6 to perform the first-stage injection and the second-stage injection on the compression stroke. Thus, the mixture gas at λ=1 is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S10, the ECU 10 outputs a control signal to the SCV 56 to close. Further, the ECU 10 outputs a control signal to the injector 6 to perform the split injections of the fuel on the compression stroke or a lump injection of the fuel on the intake stroke. Thus, stratified mixture gas is formed in the combustion chamber 17 where the strong swirl flow is generated. Then at S13, the ECU 10 outputs a control signal to the spark plug 25 to perform the ignition at a given timing before CTDC. Thus, the engine 1 performs the SPCCI combustion.

At S11, the ECU 10 outputs a control signal to the SCV 56 to open half. Further, the ECU 10 outputs a control signal to the injector 6 to perform the fuel injection from the final stage of the compression stroke to the early stage of the expansion stroke. Then at S13, the ECU 10 outputs a control signal to the spark plug 25 to perform the ignition at a given timing after the fuel injection and after CTDC. Thus, the engine 1 performs the SI combustion.

At S12, the ECU 10 outputs a control signal to the SCV 56 to open. Further, the ECU 10 outputs a control signal to the injector 6 to perform the fuel injection on the intake stroke. Thus, homogeneous or substantially homogeneous mixture gas is formed in the combustion chamber 17. Then at S13, the ECU 10 outputs a control signal to the spark plug 25 to perform the ignition at a given timing before CTDC. Thus, the engine 1 performs the SI combustion.

Other Embodiments

Note that the art disclosed here is not limited to the application to the engine 1 having the above configuration. The configuration of the engine 1 may adopt various configurations. Further, the engine 1 may include a turbocharger instead of the mechanical booster 44.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Control Unit)
17 Combustion Chamber
25 Spark Plug
3 Piston
56 Swirl Control Valve (Swirl control valve)
6 Injector (Fuel Injection valve)

What is claimed is:

1. A control system for a compression-ignition engine, comprising:
an engine including a cylinder, a piston for reciprocating inside the cylinder along a center axis thereof, and a cylinder head, and formed with a combustion chamber defined by the cylinder, the piston, and the cylinder head;
a spark plug disposed in the combustion chamber;
an intake port configured to introduce intake air into the combustion chamber;
a swirl control valve provided in an intake passage connected to the intake port, wherein the swirl control valve is configured to generate an inclined swirl flow inside the combustion chamber flowing obliquely with respect to a center axis of the combustion chamber;
a fuel injection valve disposed at a radial center of a ceiling portion of the combustion chamber, such that the fuel injection valve is configured to inject fuel so that a spray thereof radially spreads obliquely downward from the radial center of the ceiling portion of the combustion chamber;
an air-fuel ratio control valve configured to adjust an air-fuel ratio of mixture gas inside the combustion chamber; and
a control unit connected to the spark plug, the fuel injection valve, the swirl control valve, and the air-fuel ratio control valve and configured to output a control signal to the spark plug, the fuel injection valve, the swirl control valve, and the air-fuel ratio control valve,
wherein a geometric compression ratio of the engine is 14:1 or above, wherein the control unit includes a processor configured to execute:
an air-fuel ratio controlling module to, when the engine being in a given operating state is detected, control the air-fuel ratio control valve to bring the air-fuel ratio of the entire mixture gas inside the combustion chamber to a given lean air-fuel ratio that is larger than a stoichiometric air-fuel ratio; and
a spark plug controlling module to, after the control by the air-fuel ratio controlling module, output the control signal to the spark plug to perform the ignition at a given ignition timing so that the mixture gas starts combustion by flame propagation and then unburned mixture gas self-ignites, the given ignition timing being stored in a memory,
wherein the control unit controls the swirl control valve and the fuel injection valve so as to achieve a state where an air-fuel ratio of the mixture gas near the spark plug is smaller than an air-fuel ratio of the mixture gas therearound, and wherein the control unit controls the fuel injection valve to inject the fuel at a given injection timing at which the state where the air-fuel ratio of the mixture gas near the spark plug is smaller than the air-fuel ratio of the mixture gas therearound is achieved.

2. The control system of claim 1, wherein the air-fuel ratio controlling module controls the fuel injection valve so that, when the spark plug performs the ignition, an air-fuel ratio of the mixture gas near the spark plug is between 20:1 and 35:1 and an air-fuel ratio of the mixture gas therearound is between 35:1 and 50:1.

3. The control system of claim 1, further comprising:
an exhaust port configured to discharge exhaust gas from the combustion chamber;
wherein the fuel injection valve is attached to the cylinder head, is disposed to be oriented into the center of the combustion chamber in a plan view thereof, and has a first nozzle port with a first nozzle port axis extending to an exhaust port side in the plan view and a second nozzle port with a second nozzle port axis extending to an intake port side in the plan view, and
wherein the processor is further configured to execute:
a swirl control valve controlling module to control an opening of the swirl control valve so that a swirl ratio inside the combustion chamber becomes 2 or above; and
a fuel injection valve controlling module to control the fuel injection valve to inject fuel at a given timing at which the swirl ratio is 2 or above.

4. The control system of claim 1, wherein the control unit outputs the control signal to the fuel injection valve to perform a first fuel portion injection in which the fuel is injected in a period from intake stroke to an intermediate stage of compression stroke, and a second fuel portion injection in which the fuel is injected after passing a first given period from the first fuel portion injection.

5. The control system of claim 4, wherein the control unit sets both execution timings of the first fuel portion injection and the second fuel portion injection to be on the intake stroke.

6. The control system of claim 4, wherein the control unit sets an execution timing of the first fuel portion injection to be on the intake stroke, and an execution timing of the second fuel portion injection to be on the compression stroke.

7. The control system of claim 4, wherein the control unit outputs the control signal to the fuel injection valve to perform a third fuel injection in which the fuel is injected after passing a second given period from the second fuel portion injection, and
wherein the control unit sets an execution timing of the first fuel portion injection to be on the intake stroke, and execution timings of the second and third fuel injections to be on the compression stroke.

8. A control system for a compression-ignition engine, comprising:
an engine formed with a combustion chamber;
an intake port configured to introduce intake air into the combustion chamber;
a swirl control valve provided in an intake passage connected to the intake port,
wherein the swirl control valve is configured to generate an inclined swirl flow inside the combustion chamber flowing obliquely with respect to a center axis of the combustion chamber;

a fuel injection valve disposed at a radial center of a ceiling portion of the combustion chamber, such that the fuel injection valve is configured to inject fuel so that a spray thereof radially spreads obliquely downward from the radial center of the ceiling portion of the combustion chamber;
a spark plug configured to ignite mixture gas formed inside the combustion chamber by the fuel injected from the fuel injection valve; and
a control unit including a processor connected to the swirl control valve, the fuel injection valve, and the spark plug and configured to output a control signal to the swirl control valve, the fuel injection valve, and the spark plug, respectively,
wherein the spark plug ignites the mixture gas to start spark ignition (SI) combustion by flame propagation and then unburned mixture gas self-ignites to cause compression ignition (CI) combustion,
wherein the spark plug performs the ignition in a state where a geometric compression ratio of the engine is 14:1 or above, an air-fuel ratio of the entire mixture gas inside the combustion chamber is a given lean air-fuel ratio that is larger than a stoichiometric air-fuel ratio, and an air-fuel ratio of the mixture gas near the spark plug is smaller than an air-fuel ratio of the mixture gas therearound,
wherein the control unit controls the swirl control valve and the fuel injection valve so as to achieve a state where the air-fuel ratio of the mixture gas near the spark plug is smaller than an air-fuel ratio of the mixture gas therearound, and
wherein the control unit controls the fuel injection valve to inject the fuel at a given injection timing at which the state where the air-fuel ratio of the mixture gas near the spark plug is smaller than the air-fuel ratio of the mixture gas therearound is achieved.

9. The control system of claim 8, wherein, when the spark plug performs the ignition, the air-fuel ratio of the mixture gas near the spark plug is between 20:1 and 35:1 and the air-fuel ratio of the mixture gas therearound is between 35:1 and 50:1.

10. The control system of claim 8, wherein the spark plug is disposed in a center portion of the combustion chamber, wherein the control unit controls the fuel injection valve to inject the fuel at a given injection timing being after the swirl control valve generates the swirl flow, and controls the spark plug to perform the ignition at a given ignition timing being after the fuel injection, so as to control the SI combustion while controlling a mixture gas distribution by the swirl flow.

11. The control system of claim 10, wherein the swirl control valve generates the swirl flow of which a swirl ratio is 2 or above.

12. The control system of claim 11, wherein the swirl control valve generates the swirl flow of which the swirl ratio is 4 or above.

13. The control system of claim 10, wherein the control unit outputs the control signal to the fuel injection valve to dividedly inject the fuel at a plurality of times on compression stroke.

14. The control system of claim 10, wherein the control unit outputs the control signal to the fuel injection valve to fix the injection timing in a case where an engine speed changes while an engine load does not change.

* * * * *